(12) United States Patent
Chen et al.

(10) Patent No.: US 12,468,167 B2
(45) Date of Patent: Nov. 11, 2025

(54) SYSTEMS AND METHODS FOR ILLUMINATING AND IMAGING OBJECTS

(71) Applicant: LIFE TECHNOLOGIES HOLDINGS PTE LIMITED, Singapore (SG)

(72) Inventors: Mingsong Chen, Singapore (SG); Benyong Shi, Singapore (SG); Tiong Han Toh, Singapore (SG); Huei Steven Yeo, Singapore (SG)

(73) Assignee: LIFE TECHNOLOGIES HOLDINGS PTE LIMITED, Singapore (SG)

( * ) Notice: Subject to any disclaimer, the term of this patent is extended or adjusted under 35 U.S.C. 154(b) by 326 days.

(21) Appl. No.: 18/100,621

(22) Filed: Jan. 24, 2023

(65) Prior Publication Data

US 2023/0273448 A1 Aug. 31, 2023

Related U.S. Application Data

(62) Division of application No. 15/782,941, filed on Oct. 13, 2017, now Pat. No. 11,592,679.

(Continued)

(51) Int. Cl.
*G02B 27/14* (2006.01)
*G02B 17/02* (2006.01)
(Continued)

(52) U.S. Cl.
CPC .............. *G02B 27/14* (2013.01); *G02B 17/02* (2013.01); *G02B 21/06* (2013.01); *G02B 21/362* (2013.01);
(Continued)

(58) Field of Classification Search
CPC ........ G02B 27/14; G02B 17/02; G02B 21/06; G02B 21/362; G02B 26/0816;
(Continued)

(56) References Cited

U.S. PATENT DOCUMENTS 4,561,731 A 12/1985 Kley
5,539,514 A 7/1996 Shishido et al.
(Continued)

FOREIGN PATENT DOCUMENTS

CN 101373309 A 2/2009
CN 103250098 A 8/2013
(Continued)

OTHER PUBLICATIONS

First Office Action and Search Report received in Chinese Patent Application No. 201710960875.X dated Nov. 25, 2020, 8 pages (including English Translation).

*Primary Examiner* — Magda Cruz
(74) *Attorney, Agent, or Firm* — Priya D. Subramony

(57) ABSTRACT

An illumination system includes a surface configured to have an imaging target placed thereon, a light source, a beam splitter and at least a first mirror. The beam splitter is configured to split the beam of light from the light source and the first mirror is configured to reflect a first beam from the beam splitter onto the surface with the imaging target. An imaging system includes an imaging surface configured to have an imaging target placed thereon, a mirror, and a capturing device. The capturing device is configured to capture an image of the imaging target through a path of emitted light that extends from the imaging target, reflects off of the mirror, and to the capturing device. The mirror, the capturing device, or both are configured to move in a diagonal direction with respect to the imaging surface to reduce a length of the path of emitted light. Systems and methods to calibrate an imaging system to remove or reduce non-uniformities within images of samples due to imaging system properties.

17 Claims, 48 Drawing Sheets

Related U.S. Application Data

(60) Provisional application No. 62/508,747, filed on May 19, 2017, provisional application No. 62/408,006, filed on Oct. 13, 2016, provisional application No. 62/408,018, filed on Oct. 13, 2016.

(51) Int. Cl.
  *G02B 21/06* (2006.01)
  *G02B 21/36* (2006.01)
  *G02B 26/08* (2006.01)
  *G02B 27/10* (2006.01)
  *G02B 27/16* (2006.01)
  *G01N 21/25* (2006.01)
  *G01N 21/64* (2006.01)
  *G01N 21/76* (2006.01)
  *G02B 6/04* (2006.01)

(52) U.S. Cl.
  CPC ..... *G02B 26/0816* (2013.01); *G02B 27/1066* (2013.01); *G02B 27/108* (2013.01); *G02B 27/16* (2013.01); *G01N 21/253* (2013.01); *G01N 21/6452* (2013.01); *G01N 21/6456* (2013.01); *G01N 21/76* (2013.01); *G02B 6/04* (2013.01)

(58) Field of Classification Search
  CPC .. G02B 27/1066; G02B 27/108; G02B 27/16; G02B 6/04; G01N 21/253; G01N 21/6452; G01N 21/6456; G01N 21/76
  USPC ......................................................... 359/629
  See application file for complete search history.

(56) References Cited

U.S. PATENT DOCUMENTS

| | | |
|---|---|---|
| 6,654,111 B2 | 11/2003 | Isozaki et al. |
| 7,751,046 B2 | 7/2010 | Levy et al. |
| 7,924,432 B2 | 4/2011 | Hess et al. |
| 11,592,679 B2* | 2/2023 | Chen .................. G02B 27/16 |
| 2006/0114792 A1 | 6/2006 | Uno et al. |
| 2007/0081151 A1* | 4/2007 | Shortt ................ G01N 21/47 |
| | | 356/237.2 |
| 2007/0242938 A1 | 10/2007 | Uno et al. |
| 2009/0051804 A1* | 2/2009 | Nomura ............... H04N 23/667 |
| | | 348/344 |
| 2009/0213457 A1 | 8/2009 | Soon et al. |
| 2009/0244717 A1 | 10/2009 | Tocci |
| 2010/0157133 A1 | 6/2010 | Kosaka et al. |
| 2011/0228068 A1 | 9/2011 | Park |
| 2012/0193520 A1* | 8/2012 | Bewersdorf ....... G02B 19/0057 |
| | | 250/578.1 |
| 2013/0077086 A1 | 3/2013 | Chuang et al. |
| 2013/0271580 A1 | 10/2013 | Tahara et al. |
| 2015/0043049 A1 | 2/2015 | Takahashi et al. |
| 2017/0336609 A1 | 11/2017 | Lerner et al. |
| 2018/0067057 A1 | 3/2018 | Shmarev et al. |

FOREIGN PATENT DOCUMENTS

| | | |
|---|---|---|
| CN | 204306791 U | 5/2015 |
| CN | 205317229 U | 6/2016 |
| CN | 207817386 U | 9/2018 |
| DE | 19728035 A1 | 1/1998 |

* cited by examiner

*2100* in cv_macro:relillum.seq 21 32 1.25
CODE V> out n
Finished zoom position 1.

Position 1

Real Chief Ray Image Height (mm) field values

| Field | Rel. Illum. |
|---|---|
| 0.0000 | 100.0000 |
| 0.4000 | 98.8460 |
| 0.8000 | 97.4230 |
| 1.2000 | 95.8144 |
| 1.6000 | 94.1472 |
| 2.0000 | 92.4156 |
| 2.4000 | 90.6491 |
| 2.8000 | 88.7938 |
| 3.2000 | 86.6203 |
| 3.6000 | 84.2812 |
| 4.0000 | 81.8164 |
| 4.4000 | 79.2596 |
| 4.8000 | 76.5893 |
| 5.2000 | 73.8500 |
| 5.6000 | 71.0108 |
| 6.0000 | 68.0717 |
| 6.4000 | 65.0479 |
| 6.8000 | 61.9404 |
| 7.2000 | 58.7060 |
| 7.6000 | 55.4139 |
| 8.0000 | 51.8891 |

FIG. 21A

2110 in cv_macro:relillum.seq 21 32 1.25
CODE V> out n
Finished zoom position 1.

Position 1

Real Chief Ray Image Height (mm) field values

| Field | Rel. Illum. |
|---|---|
| 0.0000 | 100.0000 |
| 0.4000 | 98.8835 |
| 0.8000 | 97.5585 |
| 1.2000 | 96.0742 |
| 1.6000 | 94.5052 |
| 2.0000 | 92.8223 |
| 2.4000 | 91.0786 |
| 2.8000 | 89.2861 |
| 3.2000 | 87.1759 |
| 3.6000 | 84.9032 |
| 4.0000 | 82.5011 |
| 4.4000 | 80.0189 |
| 4.8000 | 77.4222 |
| 5.2000 | 74.7515 |
| 5.6000 | 71.9998 |
| 6.0000 | 69.1379 |
| 6.4000 | 66.1802 |
| 6.8000 | 63.1295 |
| 7.2000 | 59.9842 |
| 7.6000 | 56.7729 |
| 8.0000 | 53.3709 |

FIG. 21B

SYSTEMS AND METHODS FOR ILLUMINATING AND IMAGING OBJECTS

CROSS-REFERENCE TO RELATED APPLICATIONS

This Application is a Divisional of U.S. patent application Ser. No. 15/782,941, filed Oct. 13, 2017, which claims the benefit of priority of U.S. Provisional Patent Application No. 62/508,747 filed May 19, 2017, and U.S. Provisional Patent Application No. 62/408,018 filed Oct. 13, 2016, and U.S. Provisional Patent Application No. 62/408,006 filed Oct. 13, 2016, each of which is incorporated herein by reference.

TECHNICAL FIELD

The present disclosure is directed to devices, systems, and methods for illuminating an object and obtaining high resolution images of the object. The present disclosure is also related to methods for image non-uniformity correction.

BACKGROUND

There is a need for imaging devices, systems, and methods that provide high resolution images of an object that do not rely on approaches such as digital magnification or use of a zoom lens. Digital magnification can often lead to image pixilation as an image is magnified. The use of a zoom lens is difficult to implement in many circumstances as the ability to satisfy various requirements such as large aperture, focal length, working distance, distortion, field curvature, and signal attenuation in a robust manner is often difficult.

There is also a need for illumination devices, systems, and methods that can provide two or more beams of light to illuminate an imaging target, particularly in a uniform illumination approach, without the use of two or more light sources at the same time. The use of multiple light sources often leads to the multiple beams of light of differing optical power being applied to the imaging target given the use of two light sources that have to be maintained separately and may have had different optical properties after manufacturing or as configured within the device or system. Furthermore, the use of multiple light sources often leads to greater non-uniformity of the overall illumination of the imaging target and also greater mechanical complexity of the illumination system, which in turn increases maintenance requirements and increases the likelihood of non-uniform illumination. Another common problem during imaging (irrespective of imaging mode) is image non-uniformity. For example, when identical samples are placed at different locations of an imaging surface or a field of view, the corresponding image appears to be non-uniform based on the location, even though the identical samples emits identical signal. There is a need in the art to address image non-uniformity.

SUMMARY

An illumination system is disclosed. The illumination system includes a surface, a light source, a beam splitter, a first mirror, and a second mirror. The surface is configured to have an imaging target placed thereon. The light source is configured to emit a beam of light. The beam splitter is configured to split the beam of light from the light source into a first beam and a second beam. The first mirror is configured to reflect the first beam to provide a reflected first beam that illuminates the surface. The second mirror is configured to reflect the second beam to provide a reflected second beam that illuminates the surface.

In another embodiment, the illumination system includes a surface, a light source, a beam splitter, and a first mirror. The surface is configured to have an imaging target placed thereon. The light source is configured to emit a beam of light. The beam splitter is configured to split the beam of light from the light source into a first beam and a second beam. The second beam illuminates the surface. The first mirror is configured to reflect the first beam from the beam splitter to provide a reflected first beam that illuminates the surface.

An illumination method is also disclosed. The method includes providing a surface with an imaging target placed thereon. The method also includes providing a beam of light with a light source. The method further includes splitting the beam of light into a first beam and a second beam. The method further includes illuminating the surface. Illuminating includes: (i) using a first mirror to reflect the first beam to produce a reflected first beam that illuminates the surface, and (ii) using a second mirror to reflect the second beam to produce a reflected second beam that illuminates the surface.

In another embodiment, the illumination method includes providing a beam of light with a light source. The method also includes splitting the beam of light into a first beam and a second beam. The method further includes illuminating a surface with an imaging target placed thereon. Illuminating includes using a first mirror to reflect the first beam to produce a reflected first beam that illuminates the surface. The second beam is split from the beam of light such that it illuminates the surface.

An imaging system is also disclosed. The imaging system includes an imaging surface, a mirror, and a capturing device. The imaging surface is configured to have an imaging target placed thereon. The capturing device is configured to capture an image of the imaging target through a path of emitted light that extends from the imaging target, reflects off of the mirror, and to the capturing device. The mirror, the capturing device, or both are configured to move in a diagonal direction with respect to the imaging surface to reduce a length of the path of emitted light.

In another embodiment, the imaging system includes an imaging surface, a mirror, a mirror shaft, a capturing device, a capturing device shaft, and a transmission block. The imaging surface is configured to have an imaging target placed thereon. The mirror is configured to move in a first diagonal direction along the mirror shaft. The capturing device is configured to capture an image of the imaging target through a path of emitted light that extends from the imaging target, reflects off of the mirror, and to the capturing device. The capturing device is configured to move in a second diagonal direction along the capturing device shaft. The transmission block transmits movement between the mirror and the capturing device, thereby causing the mirror and the capturing device to move simultaneously.

An imaging method is also disclosed. The method includes placing an imaging target on an imaging surface. The method also includes causing a capturing device, a mirror, or both to move in a diagonal direction with respect to the imaging surface. The method further includes capturing an image of the imaging target, using the capturing device, through a path of emitted light that extends from the imaging target, reflects off of the mirror, and to the capturing device.

An illumination and imaging system is also disclosed. The system includes a surface configured to have an imaging target placed thereon. A light source is configured to emit a beam of light. A beam splitter is configured to split the beam of light from the light source into a first beam and a second beam. A first illumination mirror is configured to reflect the first beam to provide a reflected first beam that illuminates the surface. A second illumination mirror is configured to reflect the second beam to provide a reflected second beam that illuminates the surface. A capturing device is configured to capture an image of the imaging target through a path that extends from the imaging target, reflects off of an emission mirror, and to the capturing device. The emission mirror, the capturing device, or both are configured to move in a diagonal direction with respect to the surface to reduce a length of the path.

An illumination and imaging method is also disclosed. The method includes placing an imaging target on a surface. The method also includes emitting a beam of light from a light source. The method further includes splitting the beam of light into a first beam and a second beam. The method further includes illuminating the imaging target. Illuminating includes: (i) using a first illumination mirror to reflect the first beam to produce a reflected first beam that illuminates the surface, and (ii) using a second illumination mirror to reflect the second beam to produce a reflected second beam that illuminates the surface. The method further includes capturing an image of the imaging target, using a capturing device, through a path that extends from the imaging target, reflects off of an emission mirror, and to the capturing device.

The disclosure, in some embodiments, describes methods for generating an image corrected for a non-uniformity. In some embodiments, a non-uniformity is displayed as images with signals of varying intensity for an identical signal measured at different locations on the field of view.

A non-uniformity correction method of the present disclosure can be applied to images obtained from a variety of samples, including biological samples that comprise biological molecules such as proteins, peptides, glycoproteins, modified proteins, nucleic acids, DNA, RNA, carbohydrates, lipids, lipidoglycans, biopolymers and other metabolites generated from cells and tissues and combinations thereof. A bimolecule or biological sample having a biomolecule can be imaged alone or can be imaged while it is dispersed, located or embedded in a membrane, a gel, a filter paper, slide glass, microplate, or a matrix, such as a polyacrylamide gel or nitrocellulose or PDVF membrane blot, an agarose gel, an agar plate, a cell culture plate or a tissue section slide. A non-uniformity correction method of the present disclosure can be applied to images obtained from any of the samples described above.

A non-uniformity correction method of the present disclosure can be applied to an image generated by a chemiluminescence change to a biological sample or to an image generated by a fluorescence change to the sample. A non-uniformity correction method of the present disclosure can be applied to an image generated by bioluminescent imaging, transillumination or reflective light imaging.

In one embodiment, a method for generating an image corrected for a non-uniformity comprises: calculating a relative illumination of an imaging lens for a plurality of pixels on an imaging sensor; generating a flat fielding matrix based upon the relative illumination; capturing or acquiring an image of one or more biological samples, wherein the image has a non-uniformity; and adjusting the captured image with the flat fielding matrix to generate an image corrected for the non-uniformity.

In one embodiment, generating a flat fielding matrix comprises inverting relative illumination to generate a flat fielding matrix. In some embodiments, relative illumination is calculated using an equation obtained by a linear or a non-linear curve fitting regression. The curve can be a first degree polynomial, a second degree polynomial, a third degree polynomial, or the like. Calculations of flat fielding matrix generate a flat fielding matrix value.

Adjusting the captured image with the flat fielding matrix comprises multiplying the captured or acquired image of one or more biological samples by the value of flat fielding matrix. In some embodiments, adjusting the captured or acquired image with the flat fielding matrix further comprises multiplying the captured or acquired image of the one or more biological samples by the value of the flat fielding matrix on a pixel-to-pixel basis to generate a flat fielded image. In some embodiments, the flat fielded image displays a correct ratio of a signal level of each captured or acquired image of the one or more biological sample irrespective of its location on a field of view.

In one embodiment, the present disclosure provides a method for generating an image corrected for a non-uniformity, comprising: calculating a relative illumination of an imaging lens of a plurality of pixels on an imaging sensor; inverting the relative illumination to generate a flat fielding matrix; capturing or acquiring an image of a biological sample; and multiplying the captured or acquired image of a biological sample by the value of the flat fielding matrix on a pixel-to-pixel basis to generate a flat fielded image.

In one embodiment, the disclosure describes methods for generating an image corrected for a non-uniformity, comprising: capturing or acquiring an image of one or more biological samples, wherein the image has a non-uniformity; and adjusting the captured or acquired image with a flat fielding matrix to generate an image corrected for the non-uniformity. Adjusting the captured or acquired image can comprise multiplying the captured image of the one or more biological samples by the value of the flat fielding matrix on a pixel-to-pixel basis to generate a flat fielded image.

In some embodiments, the flat fielding matrix is in an imager or imaging system. The flat fielding matrix is available to a user using the imager. The flat fielding matrix value can be stored in an imaging device. In some embodiments, the flat fielding matrix value can be stored in a software component or computer component of the imaging device. The flat fielding matrix value is available to a user using the imaging system performing the non-uniformity correction. In some embodiments, the flat fielding matrix is a flat fielding master matrix.

In one embodiment, a method for generating a flat fielding matrix for correcting images for a non-uniformity, comprises: calculating a relative illumination of an imaging lens for a plurality of pixels on an imaging sensor; generating a flat fielding matrix based upon the relative illumination and normalizing flat fielding matrix based on the maximum pixel intensity value in the matrix. In one embodiment, generating the flat fielding matrix comprises inverting the relative illumination and normalization of the values in the matrix. For example, a manufacturer or a user can generate a flat fielding matrix for future use.

Additional objects and advantages of the disclosure will be set forth in part in the description which follows, and in part will be obvious from the description, or can be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

FIG. 21A illustrates a table showing relative illumination of an imaging lens against sensor image height with a 1× zoom, and FIG. 21B illustrates a table showing relative illumination of an imaging lens against sensor image height with a 2× zoom, according to an embodiment.

FIG. 26A illustrates an image of in a middle position of the field of view with a 1× zoom, FIG. 26B illustrates an image in a position between the middle position and the top right diagonal position of the field of view with a 1× zoom, according to an embodiment, and FIG. 26C illustrates an image of in a top right diagonal position of the field of view with a 1× zoom.

DETAILED DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure can be practiced. These implementations are described in sufficient detail to enable those skilled in the art to practice the present disclosure and it is to be understood that other implementations can be utilized and that changes can be made without departing from the scope of the present disclosure. The following description is, therefore, merely exemplary.

Figure 1:
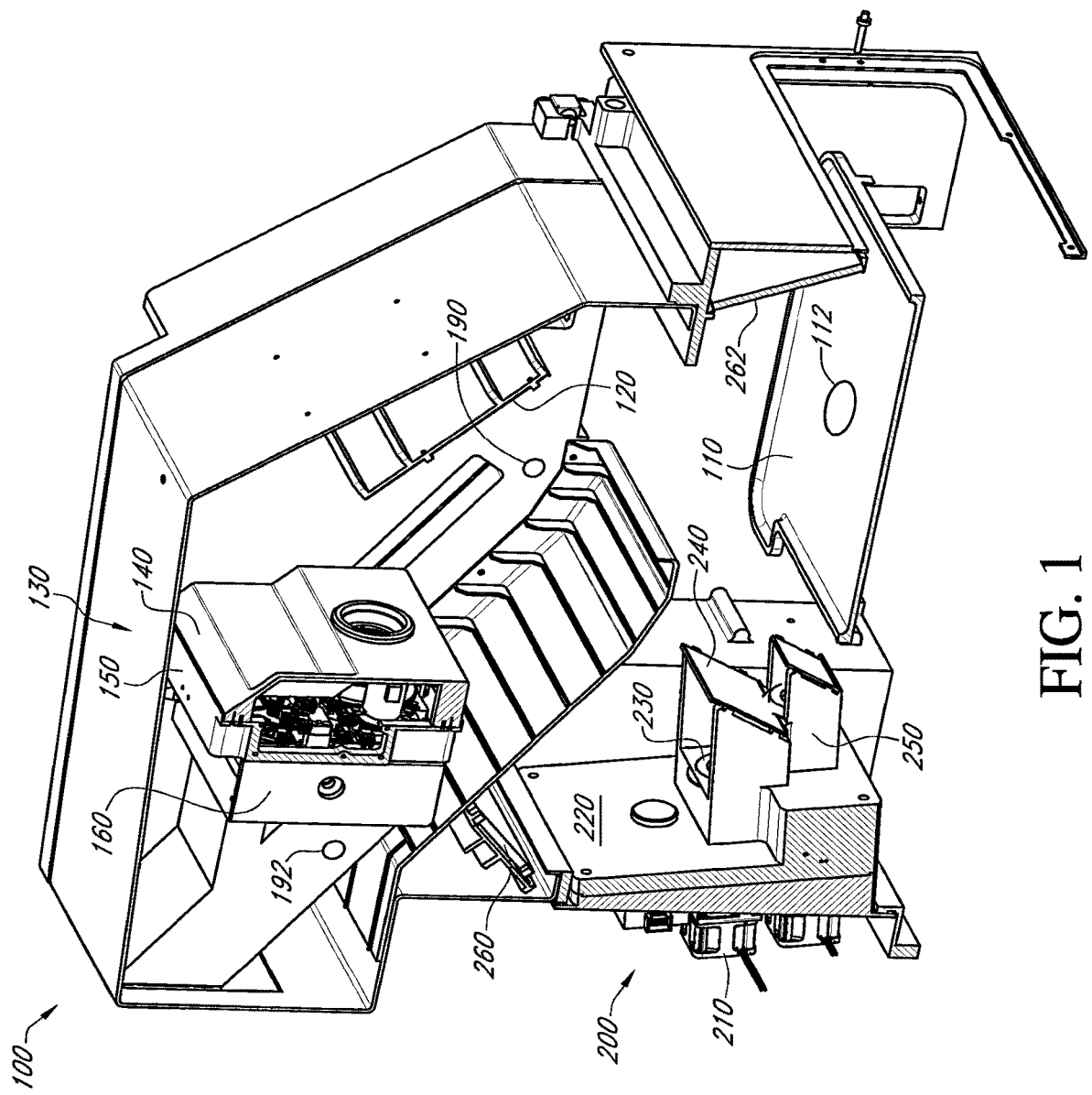
FIGS. 1 and 2 illustrate perspective views (from different angles) of an imaging system, according to an embodiment.
Figure 2:
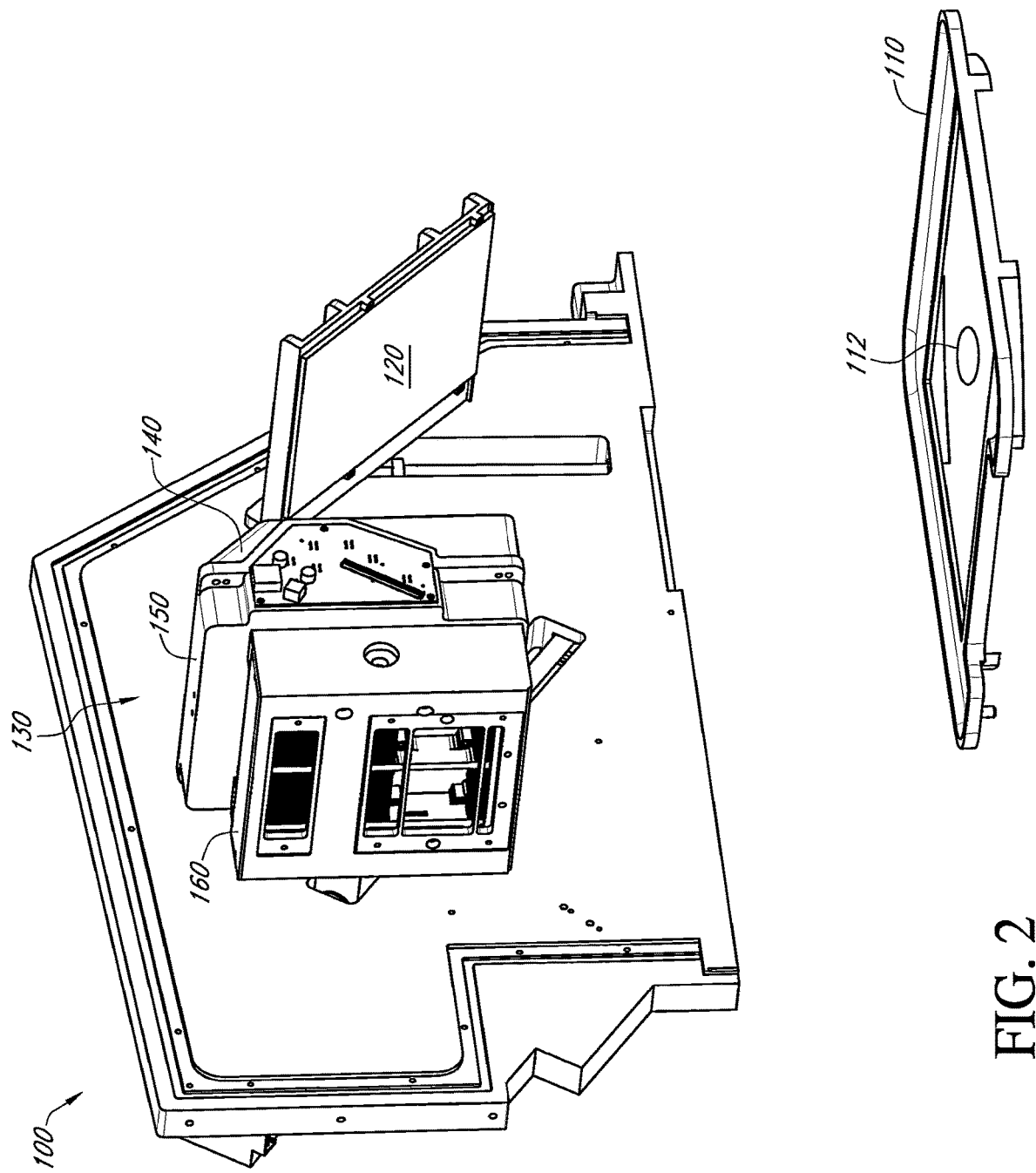

FIGS. 1 and 2 illustrate perspective views of portions of an imaging system 100 taken from different angles, according to an embodiment. The imaging system 100 may include an imaging surface 110. In one example, the imaging surface 110 may be or include a tray or a screen. The imaging surface 110 may be planar and substantially horizontal (i.e., parallel with the ground). An imaging target 112 may be placed on the imaging surface 110. The imaging target 112 may be or include biological materials such as nucleic acids and/or proteins associated with polyacrylamide gels, agarose gels, nitrocellulose membranes, and PVDF membranes. The imaging target 112 may also be or include non-biological materials such as manufactured articles and documents.

The imaging system 100 may also include a mirror 120. The mirror 120 may be positioned (e.g., directly) above the imaging surface 110 and the imaging target 112. The mirror 120 may include a reflective surface. As shown, the reflective surface may be planar; however, in other embodiments, the reflective surface may be curved. When the reflective surface of the mirror 120 is planar, the reflective surface of the mirror 120 may be oriented at an angle with respect to the imaging surface 110 (i.e., with respect to horizontal). The angle may be from about 10° to about 80°, about 20° to about 70°, or about 30° to about 60°. For example, the angle may be about 45°.

The imaging system 100 may also include a capturing device 130. The capturing device 130 may include a detector housing 140, one or more filters (one is shown: 150), and a camera 160. The detector housing 140 may be positioned above the imaging surface 110 and laterally (e.g., horizontally) offset from the mirror 120. The detector housing 140 may include a lens 142. The detector housing 140 may also include a filter wheel, a motor, and/or sensors that control the focus and aperture of the lens 142. The lens 142 may be planar, and a central longitudinal axis through the lens 142 may intersect the reflective surface of the mirror 120. As such, a path of emitted light may extend vertically between the imaging target 112 and the mirror 120, and laterally between the mirror 120 and the lens 142 of the detector housing 140. As used herein, a "path of emitted light" refers to a route of a field of view from an imaging target 112 to the camera 160 through the lens 142.

The filter 150 may be coupled to and positioned behind the detector housing 140, and the path of emitted light may extend through the detector housing 140 and into the filter 150. The filter 150 may be an electromagnetic ("EM") filter that transmits only selected wavelengths of light to the camera 160. Placing the filter 150 behind the lens 142 may allow the filter 150 to be smaller than if the filter 150 is placed in front of the lens 142. Both excitation and emission light may enter the lens 142. The excitation light blocked by the filter 150 may hit the lens 142 and surrounding surfaces, and a certain amount of the excitation light may bounce back to the filter 150 again and may pass through the filter 150 this time. In another embodiment, a filter may be placed in front of the lens 142. Because excitation is blocked by the filter in front of the lens 142, there may be very little excitation light after the filter e.g., almost no excitation light propagates inside the lens 142 to the camera 160, which makes stray light control easy and the background signal lower. The filter in front of the lens 142 may be larger than the filter 150 behind the lens. Therefore, the size of the filter wheel may be larger and occupy more space. In certain embodiments, a second filter may also be placed in front of lens 142. In such embodiments, the second filter, which may be a notch filter in certain embodiments, is placed in front of lens 142 while filter 150 is placed behind lens 142. These embodiments can provide an advantage of the two filters working together to minimize stray light, including stray excitation light, from affecting the emissions captured by camera 160.

The camera 160 may be coupled to and positioned behind the filter 150, and path of emitted light may extend through the filter 150 and into the camera 160, where the camera 160 may capture one or more (e.g., filtered) images of the imaging target 112.

The imaging system 100 may also include a first sensor 190 in a first position and a second sensor 192 in a second position (shown in FIG. 1). The first sensor 190 may be a limit sensor that is configured to limit the travel distance of the detector housing 140, the filter 150 and the camera 160. The second sensor 192 may be a homing sensor that is configured to set the detector housing 140, the filter 150 and the camera 160 to the initial default position.

The imaging system 100 may also include an illumination module 200 (shown in FIG. 1). The illumination module 200 may be or include an epi-illumination module and/or a diascopic illumination module. The illumination module 200 may include a light source 210. The light source 210 may be or include one or more light-emitting diodes ("LEDs"). The illumination module 200 may also include an excitation filter 220 that is coupled to and positioned in front of the light source 210. The excitation filter 220 may be configured to limit the range of wavelength of light from the light source 210. The illumination module 200 may also include a lens 230 that is coupled to and positioned in front of the excitation filter 220. In at least one embodiment, the lens 230 may be or include a toroidal lens. The illumination module 200 may also include a beam splitter 240 that is coupled to and positioned in front of the lens 230. The beam splitter 240 may be configured to split or divide the beam from the light source 210 into two or more beam portions. The illumination module 200 may also include a near-infrared ("NIR") illumination module and mirror 250 that may be positioned proximate to (e.g., below) the light source 210, the excitation filter 220, the lens 230, the beam splitter 240, or a combination thereof. The NIR illumination module and mirror 250 may include a LED that provides light in the NIR range. The NIR illumination module and mirror 250 may also reflect the NIR light into the beam splitter 240 at substantially the same angle as the visible light. The illumination module 200 may also include a back mirror 260 that is positioned below the capturing device 130 and/or above the light source 210, the excitation filter 220, the lens 230, the beam splitter 240, or a combination thereof. The illumination module 200 may also include a front mirror 262. The imaging surface 110 may be positioned laterally (e.g., horizontally) between the light source 210, the excitation filter 220, the lens 230, the beam splitter 240 on one side and the front mirror 262 on the other side. The front mirror 262 may also be positioned above the imaging surface 110. Although not shown, the illumination module 200 may also include a diascopic illumination module and a light source (e.g., LEDs). The light source or light sources for diascopic illumination may be positioned below the imaging surface 110 to provide illumination through the imaging surface 110 and the imaging target 112.

Figure 3:
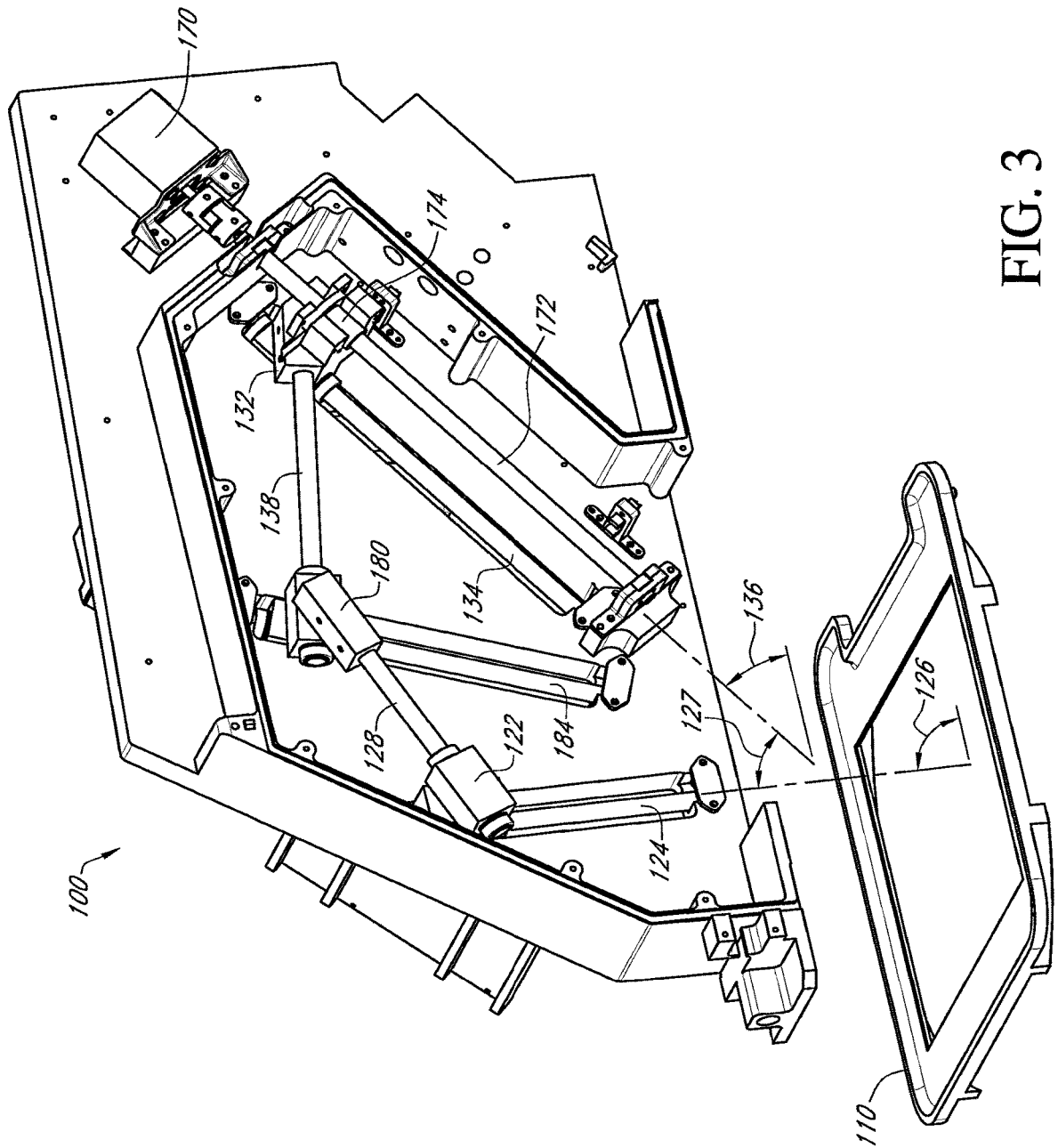
FIGS. 3 and 4 illustrate perspective views of the imaging system with some of the components from FIGS. 1 and 2 omitted to better show the shafts to which the components are coupled, according to an embodiment.
Figure 4:
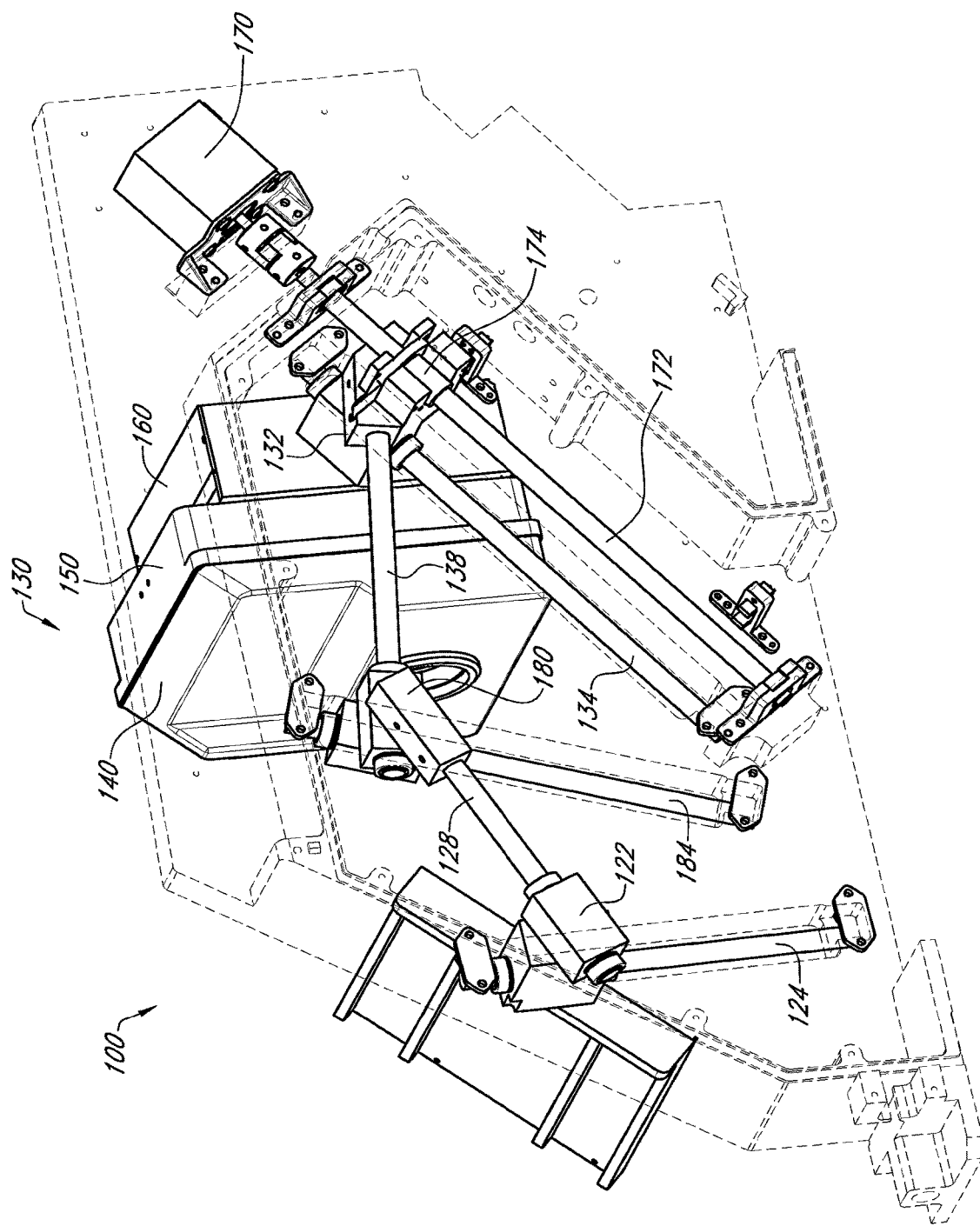

FIGS. 3 and 4 illustrate perspective views of the imaging system 100 with some of the components (e.g., the mirror 120 and the capturing device 130) omitted to better show the shafts 124, 134 to which the components are coupled, according to an embodiment.

The mirror 120 (not shown in FIGS. 3 and 4) may be coupled to a mirror support structure 122, and the capturing device 130 (also not shown in FIGS. 3 and 4) may be coupled to a capturing device support structure 132. The mirror support structure 122 may be coupled to and configured to slide back and forth along a mirror shaft 124 in an axial direction that is aligned (e.g., parallel) with the mirror shaft 124. The capturing device support structure 132 may be coupled to and configured to slide back and forth along a capturing device shaft 134 in an axial direction that is aligned (e.g., parallel) with the capturing device shaft 134. A transmission block 180 may be coupled to and configured to slide back and forth along a transmission block shaft 184 in an axial direction that is aligned (e.g., parallel) with the transmission block shaft 184. In at least one embodiment, the mirror shaft 124, the capturing device shaft 134, the transmission block shaft 184, or a combination thereof may be in a single plane.

The mirror shaft 124 may be oriented diagonally with respect to the upper surface of the imaging surface 110. As used herein "diagonally" refers to a direction that is neither parallel nor perpendicular to the imaging surface 110. More particularly, the mirror shaft 124 may be oriented at an angle with respect to the imaging surface 110 that is from about 10° to about 170°, about 40° to about 140°, or about 70° to about 110° (when viewed from the direction shown in FIGS. 3 and 4). For example, the angle 126 may be about 91° (when viewed from the direction shown in FIGS. 3 and 4).

The capturing device shaft 134 may also be oriented diagonally with respect to the imaging surface 110 (i.e., with respect to horizontal). More particularly, the capturing device shaft 134 may be oriented at an angle 136 with respect to the imaging surface 110 that is from about 10° to about 80°, about 20° to about 70°, or about 30° to about 60° (when viewed from the direction shown in FIGS. 3 and 4). For example, the angle 136 may be about 35° (when viewed from the direction shown in FIGS. 3 and 4). An angle 127 between the mirror shaft 124 and the capturing device shaft 134 may be from about 80° and about 140°, about 90° and about 130°, or about 100° and about 120°. For example, the angle 127 may be about 123°.

The transmission block shaft 184 may be positioned between the mirror shaft 124 and the capturing device shaft 134 (i.e., within the angle 127). The transmission block shaft 184 may also be oriented diagonally or perpendicular (i.e., vertical) with respect to the upper surface of the imaging surface 110.

Referring to FIG. 4, a first transmission shaft 138 may be coupled to and extend between the capturing device support structure 132 and the transmission block 180. The capturing device support structure 132 (and the capturing device 130), the transmission block 180, or a combination thereof may be configured to slide axially along the first transmission shaft 138. A second transmission shaft 128 may be coupled to and extend between the mirror support structure 122 and the transmission block 180. The mirror support structure 122 (and the mirror 120), the transmission block 180, or a combination thereof may be configured to slide axially along the second transmission shaft 128.

The imaging system 100 may include one or more motors (one is shown in FIG. 3: 170). The motor 170 may cause the mirror 120 and/or the capturing device 130 (e.g., the detector housing 140, the filter 150, and the camera 160) to move with respect to the imaging surface 110 and the imaging target 112. In the embodiment shown, the single motor 170 may cause the mirror 120 and the capturing device 130 to move simultaneously. This simultaneous movement with a single motor may be enabled by use of a power transmission shaft and block that links the mirror 120 and the capturing device 130, such as the first transmission shaft 138, the second transmission shaft 128, and the transmission block 180 as described above in reference to FIG. 4. Such an approach provides the advantage of controlling the motion of both the mirror 120 and the capturing device 130 with a single motor and in a synchronized fashion that is not dependent on a separate control mechanism, such as control software, thereby providing the advantage of lower complexity and cost, reduced maintenance requirements, and an improved ability to maintain a consistent image center at different degrees of zoom. In another embodiment, a first motor may cause the mirror 120 to move, and a second motor may cause the capturing device 130 to move, and a ratio of the movement of the mirror 120 with respect to the capturing device 130 may be fixed. Fixing this ratio of movement may be accomplished via the software controlling the first and second motors and would enable synchronized movement while also keeping the center of the image consistent during zooming. The transmission block 180 may be coupled to the mirror 120 and the capturing device 130. When a single motor 170 is used, the transmission block 180 may link the movement of the mirror 120 and the capturing device 130, as described in greater detail in FIGS. 3 and 4. In a different embodiment, one or more belt drives or other devices may be used to move the mirror 120 and the capturing device 130.

Referring again to FIGS. 3 and 4, the motor 170 may be coupled to a lead screw 172 via a coupler 174. The coupler 174 may transfer rotary motion of the motor 170 to the lead screw 172, thereby causing the lead screw 172 to rotate. The lead screw 172 may be parallel with the capturing device shaft 134. When the lead screw 172 rotates in a first direction, the lead screw 172 may push the capturing device support structure 132 (and the capturing device 130) in a first axial direction along the capturing device shaft 134. Conversely, when the lead screw 172 rotates in a second (i.e., opposite) direction, the lead screw 172 may pull the capturing device support structure 132 (and the capturing device 130) in a second (i.e., opposite) axial direction along the capturing device shaft 134.

When the capturing device support structure 132 (and the capturing device 130) move in the first axial direction along the capturing device shaft 134, the first transmission shaft 138 may cause the transmission block 180 to move in a first axial direction along the transmission block shaft 184. Conversely, when the capturing device support structure 132 (and the capturing device 130) move in the second axial direction along the capturing device shaft 134, the first transmission shaft 184 may cause the transmission block 180 to move in a second (i.e., opposite) axial direction along the transmission block shaft 184.

When the transmission block 180 moves in the first axial direction along the transmission block shaft 184, the second transmission shaft 128 may cause the mirror support structure 122 (and the mirror 120) to move in a first axial direction along the mirror shaft 124. Conversely, when the transmission block 180 moves in the second axial direction along the transmission block shaft 184, the second transmission shaft 128 may cause the mirror support structure 122 (and the mirror 120) to move in a second (i.e., opposite) axial direction along the mirror shaft 124.

Thus, as will be appreciated, the mirror 120 and the capturing device 130 may move together simultaneously. When the mirror 120 and the capturing device 130 move in their respective first axial directions, the total length of the path of emitted light from the imaging target 112 (reflecting off the mirror 120) to the lens 142 of the detector housing 140 may decrease, and when the mirror 120 and the capturing device 130 move in their respective second axial directions, the total length of the path of emitted light from the imaging target 112 (reflecting off the mirror 120) to the lens 142 of the detector housing 140 may increase.

Figure 5:
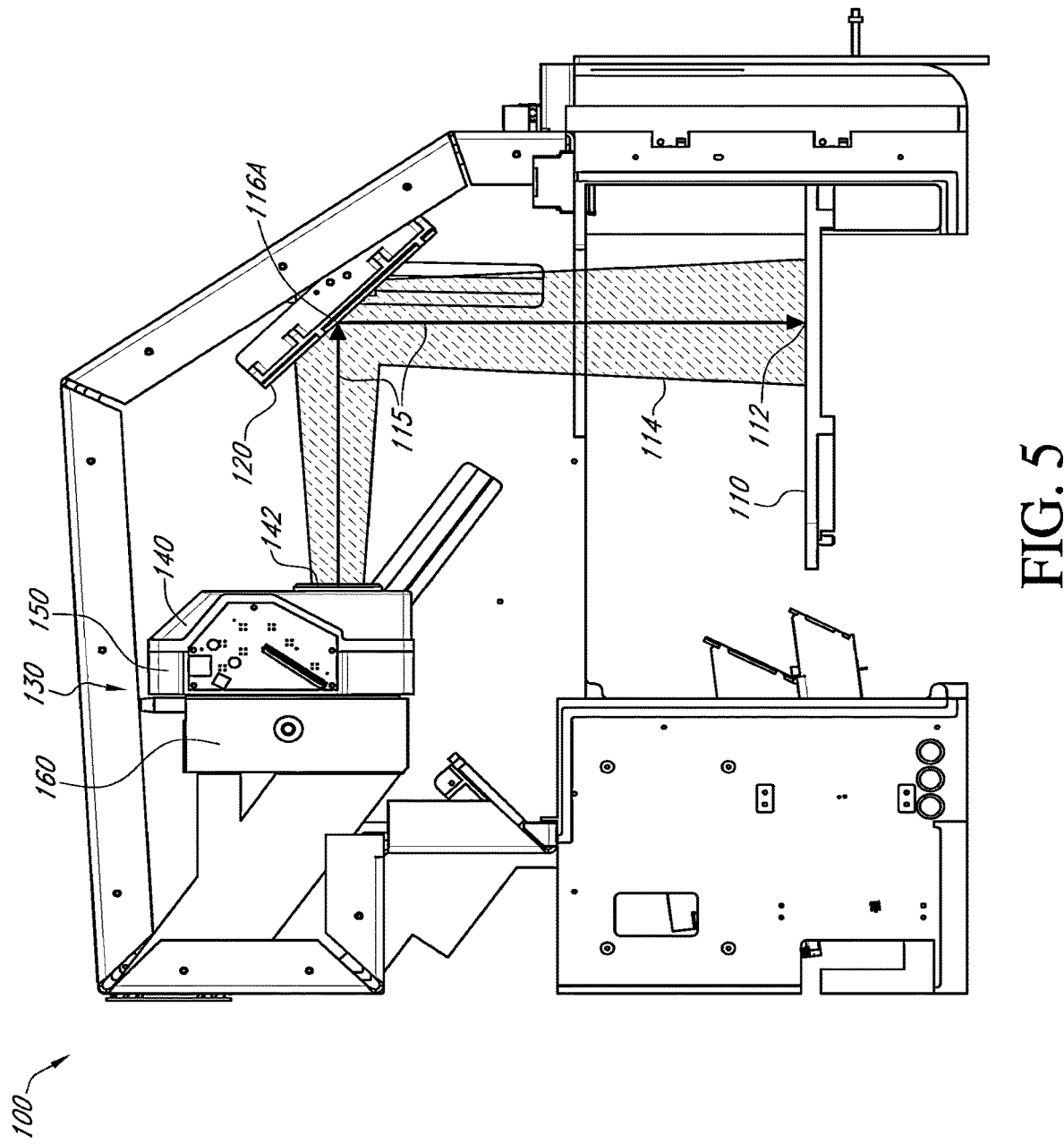
FIGS. 5, 6, 7, and 8 illustrate cross-sectional side views of the imaging system proceeding through increasing levels of zoom, according to an embodiment.

FIGS. 5, 6, 7 and 8 illustrate cross-sectional side views of the imaging system 100 proceeding through increasing levels of zoom, according to an embodiment. More particularly, FIG. 5 illustrates the imaging system 100 with no zoom. The total length of a center of the path of emitted light 115 from the imaging target 112 (reflecting off the mirror 120) to the lens 142 of the detector housing 140 when there is no zoom may be, for example, about 455 mm in one embodiment, but the total length of the center of the path of emitted light 115 will depend on the overall configuration of a system and its components, including the properties of the capturing device 130. The path of emitted light 114 may contact a first portion (e.g., surface area) of the mirror 120 when there is no zoom. The first portion (e.g., surface area) may be from about 50% to about 100%, about 75% to about 99%, or about 85% to about 95% of the total surface area of the mirror 120.

Figure 6:
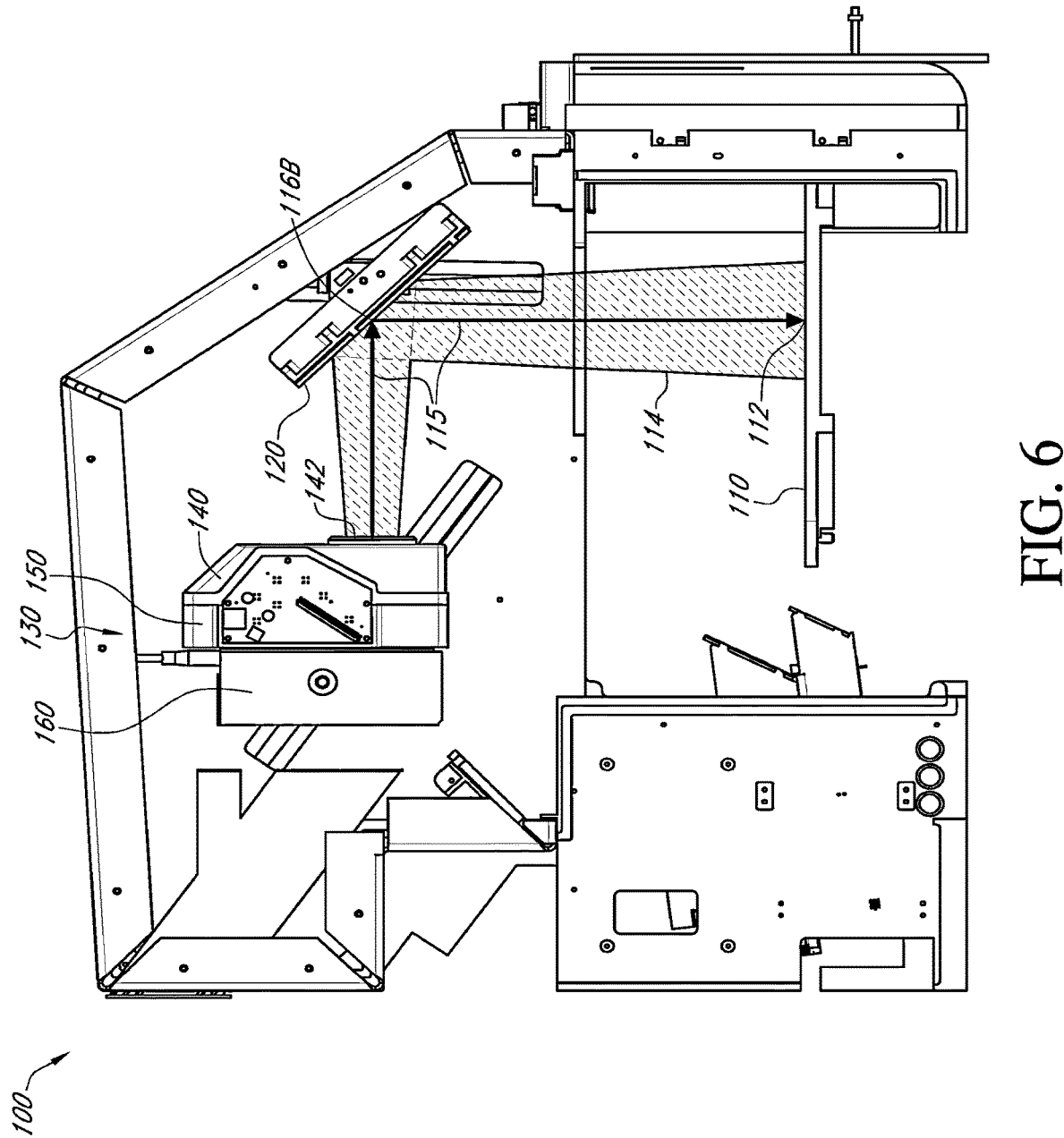

Referring now to FIG. 6, the capturing device 130 and the mirror 120 may move in their respective first axial directions to reduce the total length of the center of the path of emitted light 115 (i.e., to zoom in on the imaging target 112 on the imaging surface 110). The center of the path of emitted light 115 between the imaging target 112 and the mirror 120 may remain stationary as the mirror 120 moves diagonally (i.e., the vertical arrow is identical in FIGS. 5 and 6). As a result, the point on the mirror 120 that the center of the path of emitted light 115 contacts may vary/move as the mirror 120 and the capturing device 130 move in their respective first axial directions. For example, the center of the path of emitted light 115 may contact the mirror 120 at point 116A in FIG. 5 and at point 116B in FIG. 6. In addition, the portion (e.g., surface area) of the mirror 120 that the path of emitted light 114 contacts may decrease as the mirror 120 and the capturing device 130 move in their first axial directions.

Figure 7:
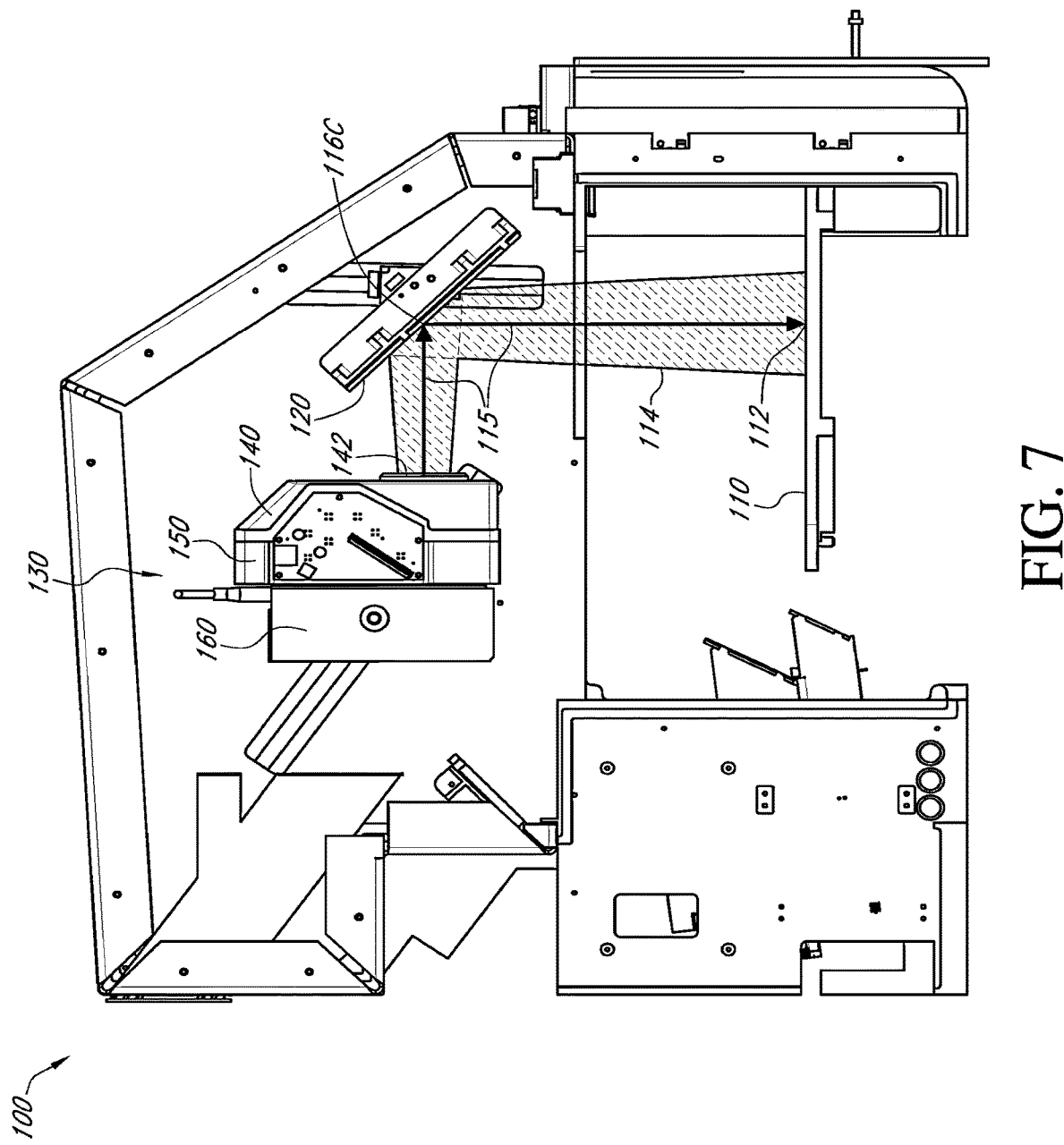

Referring now to FIG. 7, the mirror 120 and the capturing device 130 may move further in their respective first axial directions to further reduce the total length of the center of the path of emitted light 115 (i.e., to zoom in on the imaging target 112 on the imaging surface 110). The center of the path of emitted light 115 between the imaging target 112 and the mirror 120 may remain stationary as the mirror 120 moves diagonally (i.e., the vertical arrow is identical in FIGS. 5-7). As a result, the point on the mirror 120 that the center of the path of emitted light 114 contacts may vary/move as the mirror 120 and the capturing device 130 move in their respective first axial directions. For example, the center of the path of emitted light 114 may contact the mirror 120 at point 116C in FIG. 7. In addition, the portion (e.g., surface area) of the mirror 120 that the path of emitted light 114 contacts may continue to decrease as the mirror 120 and the capturing device 130 move further in their first axial directions.

Figure 8:
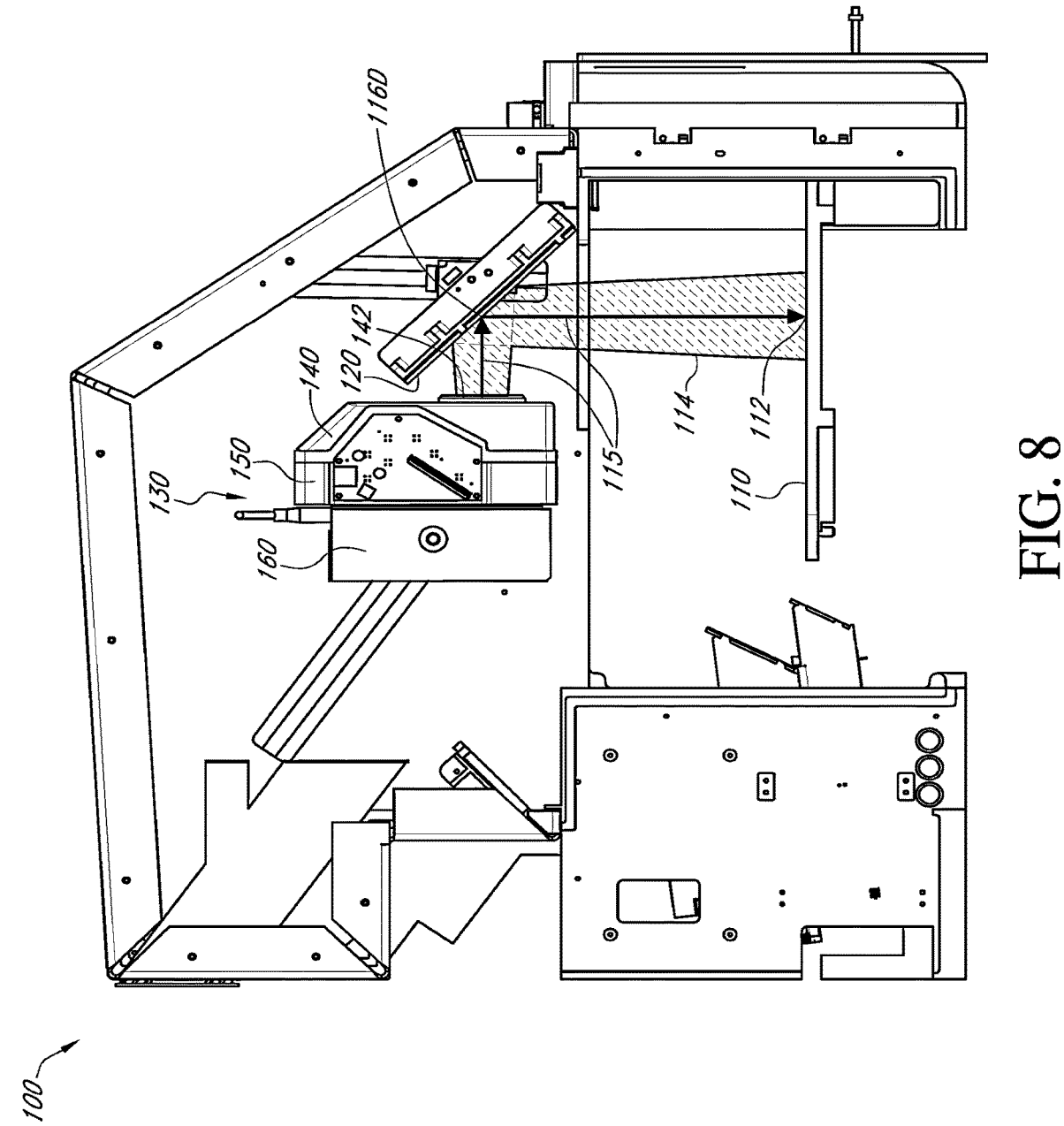

Referring now to FIG. 8, the mirror 120 and the capturing device 130 have minimized the total length of the center of the path of emitted light 115 (i.e., to maximize zoom on the imaging target 112 on the imaging surface 110). The center of the path of emitted light 115 between the imaging target 112 and the mirror 120 may remain stationary as the mirror 120 moves diagonally (i.e., the vertical arrow is identical in FIGS. 5-8). As a result, the point on the mirror 120 that the center of the path of emitted light 115 contacts may vary/move as the mirror 120 and the capturing device 130 move in their respective first axial directions. For example, the center of the path of emitted light 115 may contact the mirror 120 at point 116D in FIG. 8. In an example, the total length of the center of the path of emitted light 115 from the imaging target 112 (reflecting off the mirror 120) to the lens 142 of the detector housing 140 when the zoom is maximized may be, for example, about 215 mm. Thus, the imaging system 100 may be configured to zoom from about 1× to about 2×; however, in other embodiments, the imaging system 100 may be configured to zoom even further (i.e., greater than 2×). In addition, the portion (e.g., surface area) of the mirror 120 that the path of emitted light 114 contacts may decrease as the zoom increases. For example, the portion (e.g., surface area) may be from about 5% to about 80%, about 10% to about 70%, or about 20% to about 60% of the total surface area of the mirror 120 when the zoom is maximized.

Figure 9:
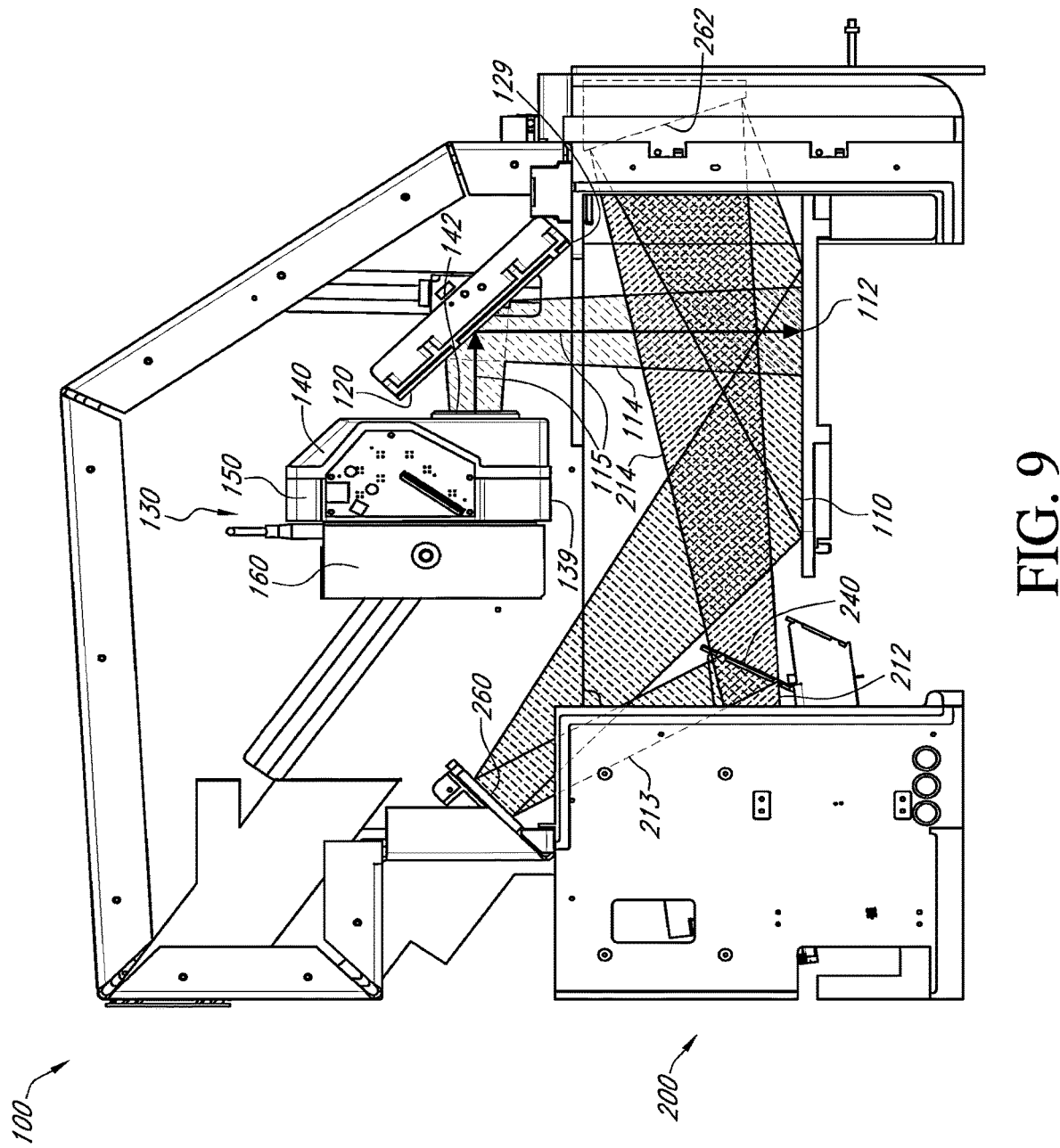
FIG. 9 illustrates a beam of light being emitted from an illumination module of the imaging system, according to an embodiment.

FIG. 9 illustrates a beam of light (e.g., an epi-illumination beam) 212 being emitted from the illumination module 200, according to an embodiment. The beam of light 212 may be emitted from the light source 210 (see FIG. 1) of the illumination module 200. The beam of light 212 may be split into first and second beams 213, 214 by the beam splitter 240. The first beam 213 may reflect off of the back mirror 260 and illuminate the imaging target 112, and the second beam 214 may reflect off of the front mirror 262 and illuminate the imaging target 112. This is described in greater detail below with respect to FIG. 11. In another embodiment, the beam of light 212 may be emitted from the NIR illumination module 250 and reflected off of the mirror in the NIR illumination module 250 to the imaging target 112. In at least one embodiment, the beam of light 212 may extend through the path of emitted light 114 to illuminate the imaging target 112, which may reflect the illumination light or may contain fluorescent components that emit light after excitation with the epi-illumination.

When the mirror 120 and the capturing device 130 are at their positions of maximum zoom, as shown in FIG. 9, a lower end 139 of the capturing device 130 may be positioned below a lower end 129 of the mirror 120. As a result, the mirror 120 may not obstruct the beam of light 214 at any point along the mirror shaft 124.

Figure 10:
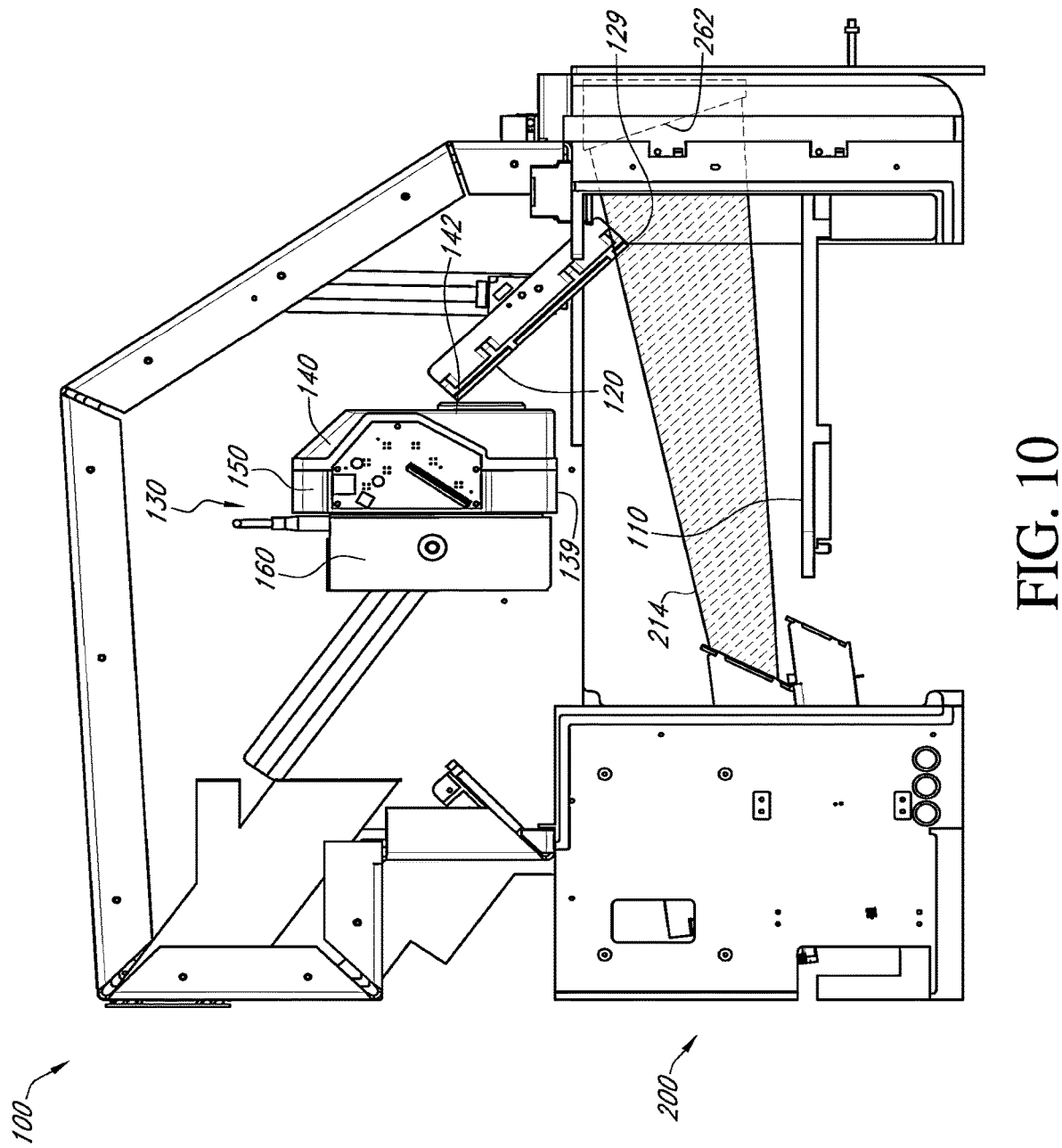
FIG. 10 illustrates the epi-illumination beam being at least partially obstructed by a mirror when the center of the path of emitted light remains centered on the mirror as the mirror moves during zooming, according to an embodiment.

FIG. 10 illustrates the epi-illumination beam 212 being at least partially obstructed by the mirror 120, according to an embodiment. If the center of the path of emitted light 114 remains fixed on the same point on the mirror 120 as the mirror moves (e.g., point 116A from FIG. 5), the lower end 129 of the mirror 120 may be positioned below the lower end 139 of the capturing device 130 when the capturing device 130 and the mirror 120 are at their positions of maximum zoom. As a result, the mirror 120 may at least partially obstruct the beam of light 212. Thus, as shown in FIGS. 5-9, the center of the path of emitted light 114 may move/vary on the mirror 120 as the mirror 120 moves during zooming to avoid blocking the beam of light 212.

Epi-illumination and/or excitation may be used for a fluorescence mode of protein analysis. Many fluorescent dyes may be used for protein stain and/or western blot, and different dyes have different excitation spectrum profiles, and thus need different colors of excitation light. A certain excitation power may provide a fluorescence imaging signal within an acceptable imaging exposure time. If the illumination and/or excitation power varies too much across the field of view, there may be one or more dark areas where it is difficult to see the land/band of the sample, or the land/band may be seen in the dark area(s), but the signal in the brighter areas becomes saturated. As a result, substantially uniform illumination may improve imaging quality.

There are two types of epi-illumination: on-axis and off-axis (i.e., oblique). On-axis illumination may generate bright spots on the image due to certain light reflections from the sample. Off-axis illumination is one way to remedy this problem. In some embodiments, the off-axis angle may be greater than or equal to a predetermined amount to avoid generating the bright spot.

Figure 11:
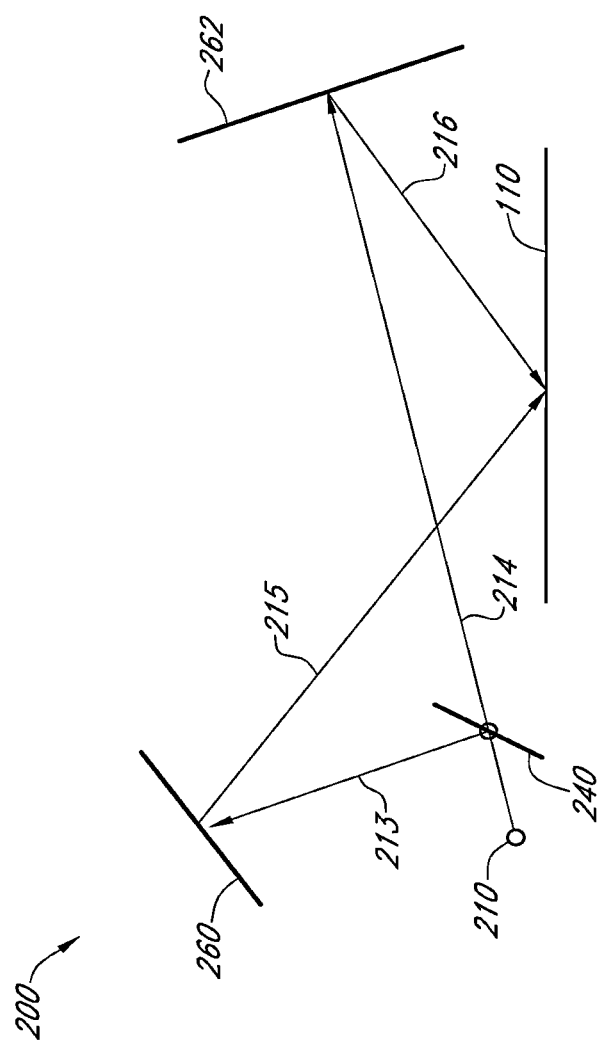
FIG. 11 illustrates a simplified schematic side view of the beam of light being emitted from the illumination module of the imaging system shown in FIG. 9, according to an embodiment.

FIG. 11 illustrates a simplified schematic side view of the beam of light 212 being emitted from the illumination module 200 shown in FIG. 9, according to an embodiment. The beam of light 212 may be emitted from the light source 210 (see FIG. 1) of the illumination module 200. The light source 210 may include a first LED for fluorescent excitation and/or a second LED for near IR. In another embodiment, a tungsten halogen lamp may be used to cover both spectrums. For any particular channel, there may be only a single beam of light. The light source 210 may have a single color. In at least one embodiment, the light source 210 may be a white light source, and optical filters may be used to generate different colors.

The beam of light 212 may be split into a first beam 213 and a second beam 214 by the beam splitter 240. Although not shown, in other embodiments, the beam splitter 240 may be configured to split the beam of light 212 into three or more beams. As used herein, the term "beam splitter" includes one or more optical components capable of splitting or otherwise separating a beam of light, and includes but is not limited to prisms, plates, dielectric mirrors, metal coated mirrors, beam splitter cubes, fiber optic beam splitters, and optical fibers configured to collimate light into a bundle before producing two or more output beams.

The beam splitter 240 may split or separate the intensity evenly between the resulting beams of light, or may split them in different proportions of intensity. In the embodiment shown, the beam splitter 240 is a plate, and the first beam 213 reflects off of the beam splitter 240 while the second beam 214 passes through the beam splitter 240. The beam splitter 240 may include a coating and/or a filter (e.g., a linear variable filter) such that one end/side of the beam splitter 240 may have different properties than the opposing end/side. The first beam 213 may include from about 40% to about 60% (e.g., 40%, 45%, 50%, 55%, or 60%) of the optical power of the beam 212, and the second beam 214 may include from about 40% to about 60% (e.g., 40%, 45%, 50%, 55%, or 60%) of the optical power of the beam 212. Thus, in certain embodiments, the first beam 213 and the second beam 214 may split the optical power of beam 212 evenly (50% for the first beam 213 and 50% for the second beam 214). In other embodiments, the first beam 213 may have a greater or lesser percentage than second beam 214 of the optical power of beam 212. An angle between a center of the first beam 213 and a center of the second beam 214 may be from about 62° to about 68°, about 70° to about 90°, or about 90° to about 110°. The first beam 213 may reflect off of the back mirror 260 producing a reflected first beam 215 that illuminates the imaging target 112 on the imaging surface 110. The second beam 214 may reflect off of the front mirror 262 producing a reflected second beam 216 that illuminates the imaging target 112 on the imaging surface 110. An angle between a center of the reflected first beam 215 and a center of the reflected second beam 216 may be from about 80° to about 100°, about 106° to about 114°, or about 120° to about 140°. Although not shown, in at least one embodiment, the second beam 214 may illuminate the imaging target 112 on the imaging surface 110 directly without reflecting off of the front mirror 262 and producing the reflected second beam 216.

The reflected first beam 215 and the reflected second beam 216 may provide off-axis illumination of the imaging target 112 on the imaging surface 110. More particularly, the reflected first beam 215 and the reflected second beam 216 may provide substantially symmetrical illumination of the imaging target 112 on the imaging surface 110. For example, an angle between the reflected first beam 215 and the imaging surface 110 may be within +/−10° of the angle between the reflected second beam 216 and the imaging surface 110. A distance from the beam splitter 240 to the back mirror 260 to the imaging surface 110 may be substantially equal to (e.g., within 10% of) a distance from the beam splitter 240 to the front mirror 262 to the imaging surface 110. In at least one embodiment, the back mirror 260 and/or the front mirror 262 may be moved in combination with rotation of beam splitter 240 in order to vary the illumination of the imaging target 112 on the imaging surface 110.

Figure 12:
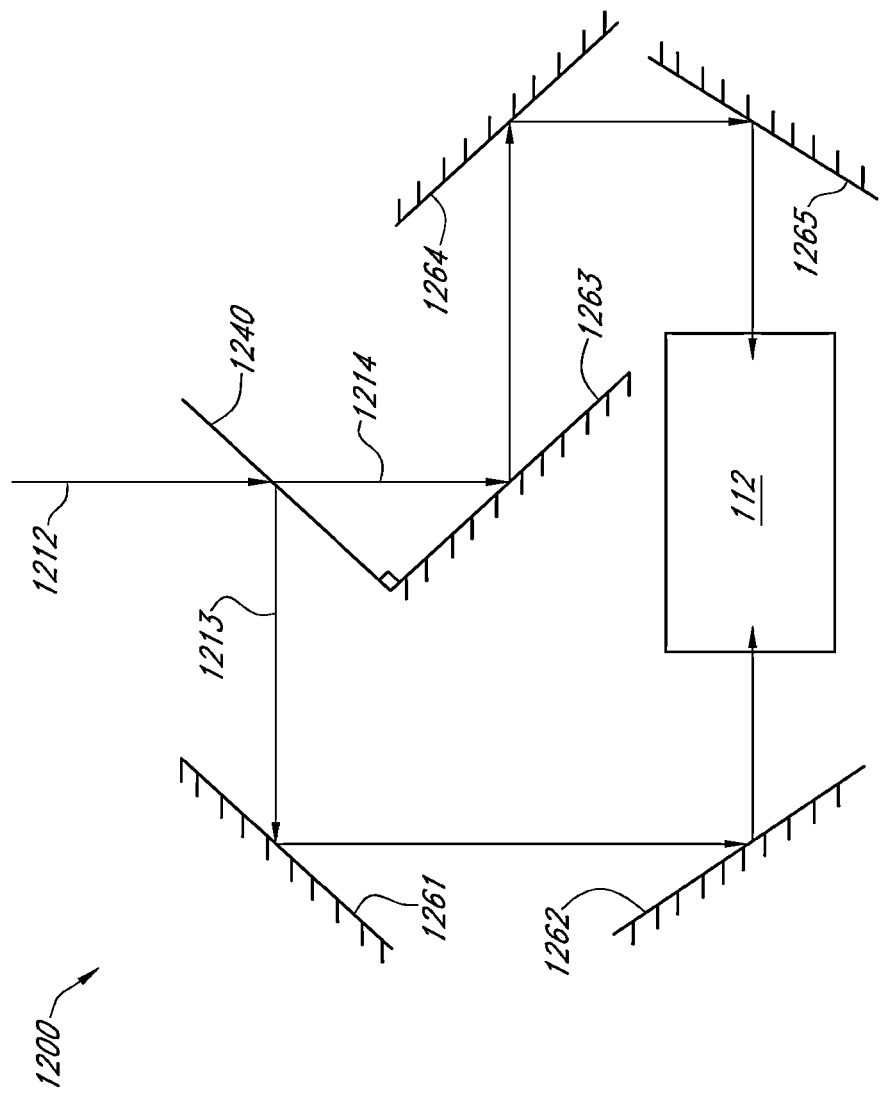
FIG. 12 illustrates a simplified schematic top view of the beam of light being emitted from an illumination module with additional mirrors, according to an embodiment.

FIG. 12 illustrates a simplified schematic top view of a beam of light 1212 being emitted from an illumination module 1200 with additional mirrors 1261-1265, according to an embodiment. In the embodiment shown, the beam of light 1212 may be emitted from the light source of the illumination module 1200 and may be split into a first beam 1213 and a second beam 1214 by the beam splitter 1240. The first beam 1213 may reflect off of the beam splitter 1240, and the second beam 1214 may pass through the beam splitter 1240. The first beam 1213 may reflect off of a first mirror 1261 and a second mirror 1262 before illuminating the imaging target 112 on the imaging surface 110. The second beam 1214 may reflect off of a third mirror 1263, a fourth mirror 1264, and a fifth mirror 1265 before illuminating the imaging target 112 on the imaging surface 110. As with the embodiment in FIG. 11, the beams 1213, 1214 may provide off-axis illumination of the imaging target 112 on the imaging surface 110. In addition, the beams 1213, 1214 may provide substantially symmetrical illumination of the imaging target 112 on the imaging surface 110.

Figure 13:
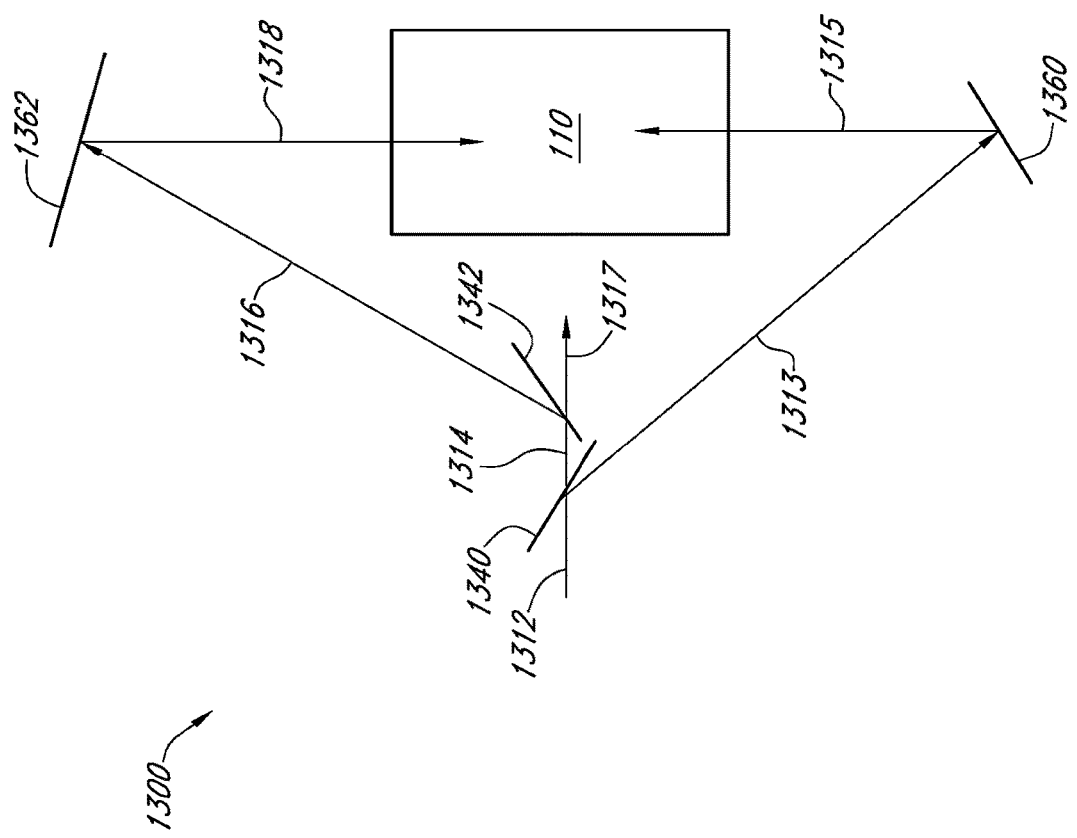
FIG. 13 illustrates a simplified schematic top view of the beam of light being emitted from an illumination module with two beam splitters, according to an embodiment.

FIG. 13 illustrates a simplified schematic top view of a beam of light 1312 being emitted from an illumination module 1300 with two beam splitters 1340, 1342, according to an embodiment. In the embodiment shown, the beam of light 1312 may be emitted from the light source of the illumination module 1300 and may be split into a first beam 1313 and a second beam 1314 by the first beam splitter 1340. The first beam 1313 may reflect off of the first beam splitter 1340 while the second beam 1314 may pass through the first beam splitter 1340. In at least one embodiment, the first beam 1313 may include from about 15% to about 35% (e.g., 15%, 20%, 25%, 30%, or 35%) of the optical power of the beam 1312, and the second beam 1314 may include from about 65% to about 85% (e.g., 65%, 70%, 75%, 80%, or 85%) of the optical power of the beam 1312.

The first beam 1313 may then reflect off of a first mirror 1360 producing a reflected first beam 1315 that illuminates the imaging target 112 on the imaging surface 110. The second beam 1314 may be split into a third beam 1316 and a fourth beam 1317 by the second beam splitter 1342. The third beam 1316 may reflect off of the second beam splitter 1342 while the fourth beam 1317 may pass through the second beam splitter 1342. In at least one embodiment, the third beam 1316 may include from about 20% to about 40% (e.g., 33%) of the optical power of the second beam 1314, and the fourth beam 1317 may include from about 60% to about 80% (e.g., 66%) of the optical power of the second beam 1314. The third beam 1316 may then reflect off of a second mirror 1362 producing a reflected third beam 1318 that illuminates the imaging target 112 on the imaging surface 110. As with the embodiment in FIG. 11, the beams 1315, 1318 may provide off-axis illumination of the imaging target 112 on the imaging surface 110. In addition, the beams 1315, 1318 may provide substantially symmetrical illumination of the imaging target 112 on the imaging surface 110.

The fourth beam 1317 may also illuminate the imaging target 112 on the imaging surface 110. As shown, the fourth beam 1317 may not reflect off of a mirror before illuminating the imaging target 112 on the imaging surface 110. In an embodiment, an angle between the first beam 1313 and the fourth beam 1317 may be within about 10° to about 40° of an angle between the third beam 1316 and the fourth beam 1317. Similarly, an angle between the reflected first beam 1315 and the fourth beam 1317 may be within about 10° to about 40° of an angle between the reflected third beam 1318 and the fourth beam 1317.

Although FIG. 13 shows three beams 1315, 1317, 1318 that illuminate the imaging target 112 on the imaging surface 110, in another embodiment, four or more beams may illuminate the imaging target 112 on the imaging surface 110. For example, four beams may illuminate the imaging target 112 on the imaging surface 110 from the front, back, left, and right.

Figure 14:
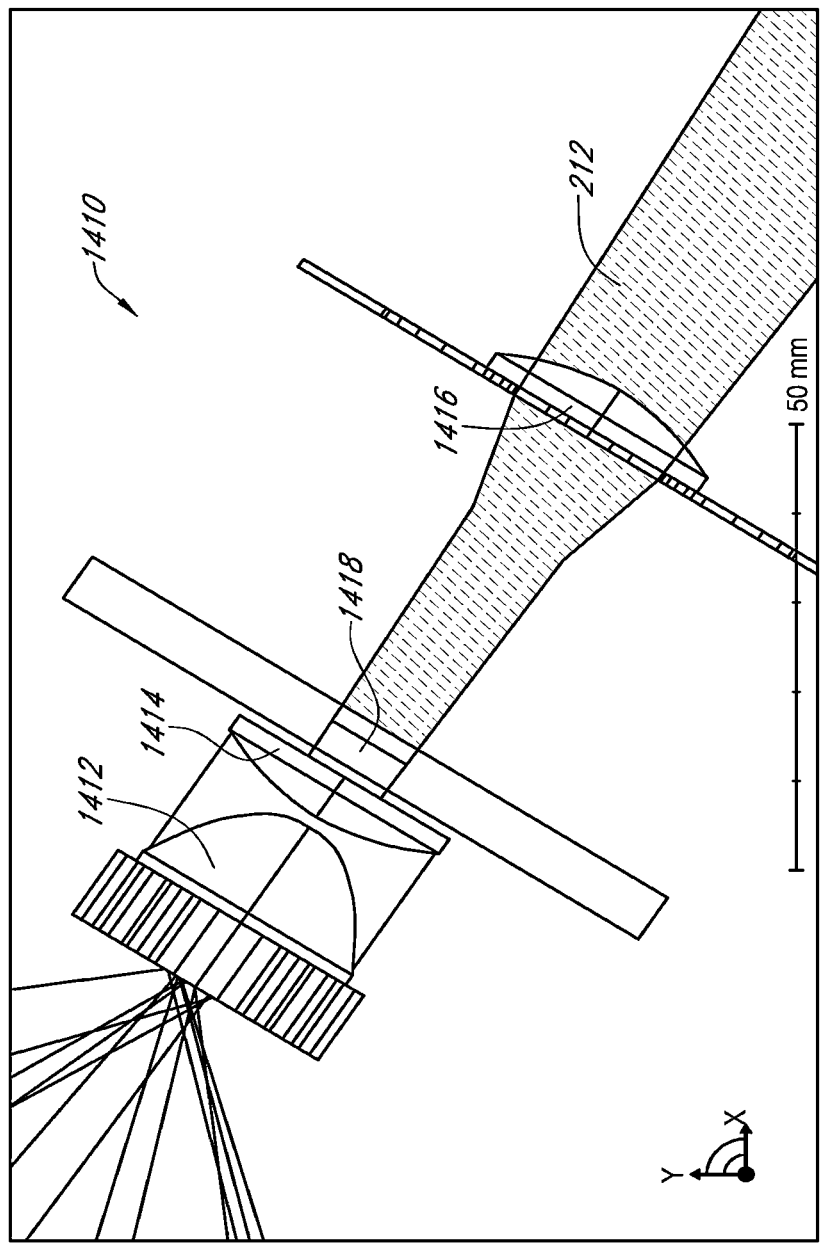
FIG. 14 illustrates a cross-sectional side view of the beam of light passing through an aperture before reaching the beam splitter, according to an embodiment.

FIG. 14 illustrates a cross-sectional side view of the beam of light 212 from FIG. 9 passing through an aperture 1418 in a beam shaper 1410 before reaching the beam splitter 240, according to an embodiment. The beam shaper 1410 may include one or more lenses (three are shown: 1412, 1414, 1416). As shown, the aperture 1418 may be positioned between the second and third lenses 1414, 1416; however, in other embodiments, the aperture 1418 may be positioned anywhere within the beam shaper 1410 or alternatively outside of the beam shaper 1410, but before the light reaches the beam splitter. The size (e.g., cross-sectional area or diameter) of the aperture 1418 may be fixed. In another embodiment, the size of the aperture 1418 may be varied to vary the size (e.g., cross-sectional area or diameter) of the illumination of the imaging target 112 on the imaging surface 110. The intensity of the beam of light 212 from the light source may also be varied to vary the intensity of the illumination of the imaging target 112 on the imaging surface 110.

Flat Fielding Calibration

An imager or an imaging system of the present disclosure can be used to image a variety biological molecules and biological samples such as proteins, peptides, glycoproteins, modified proteins, nucleic acids, DNA, RNA, carbohydrates, lipids, lipidoglycans, biopolymers and other metabolites generated from cells and tissues. A biological sample can be imaged alone or can be imaged while is it in a membrane, a gel, a filter paper, slide glass, microplate, or a matrix, such as a polyacrylamide gel or nitrocellulose or PDVF membrane blot, an agarose gel, an agar plate, a cell culture plate or a tissue section slide.

Imaging systems of the present disclosure can image biomolecules and biological samples in several imaging modes including fluorescent imaging, chemiluminescent imaging, bioluminescent imaging, transillumination or reflective light imaging. In some imaging modes, a sample emits light or displays a change in the light it emits (wavelength, frequency or intensity change), without external illumination or excitation, which can be imaged. In some imaging modes, a sample emits light or has a change in the light it emits (wavelength, frequency or intensity change), following exposure to external illumination or excitation, which can be imaged. In some imaging modes, a sample reflect light or has a change in the light it reflects (frequency or intensity change), following exposure to external illumination, which can be imaged.

A common problem faced during imaging (irrespective of imaging mode) is that when identical samples are placed at different locations of an imaging surface or a field of view, the image appears to be non-uniform based on the location. An imaging surface is exemplified in one embodiment by part 110 in FIG. 1, and is also referred to alternatively herein as imaging area, field of view, a sample screen or a sample tray. In some embodiments, image non-uniformity is displayed as images with signals of varying intensity for an identical signal measured at different locations on an imaging surface or field of view. In some embodiments, image non-uniformity is displayed as images with different signals levels for an identical signal measured at different locations on an imaging surface or field of view. Non-uniformity of image signal due to location is partially due to one characteristic of an imaging lens i.e., relative illumination.

Non-uniformity of image based on location of sample on an imaging surface prevents accurate quantitative measurements of biomolecules. The present disclosure describes systems, algorithms and methods used to calibrate lens assemblies of an imaging system to remove non-uniformities exhibited by the lens to obtain accurate data from the sample images of biomolecules. Calibration of lens assemblies by methods and systems of the present disclosure removes non-uniformities exhibited by the lens to obtain accurate data from sample images.

As described in embodiments above, imaging and illuminating devices and systems of the present disclosure provide imaging correction features to enhance data accuracy with image analysis. These features alone or combined further with methods, and systems to calibrate image non-uniformity to provide superior and accurate quantitative measurements of biological samples in an electrophoresis gel or on a membrane and subsequently provide confidence in data analysis and information of the image that is obtained from a sample.

In one embodiment, a method for generating an image corrected for a non-uniformity comprises: calculating a relative illumination of an imaging lens for a plurality of pixels on an imaging sensor; generating a flat fielding matrix based upon the relative illumination; capturing an image of one or more biological samples, wherein the image has a non-uniformity; and adjusting the captured image with the flat fielding matrix to generate an image corrected for the non-uniformity.

In one embodiment, adjusting the captured image with the flat fielding matrix comprises multiplying a captured image of a biological sample by the value of the flat fielding matrix on a pixel-to-pixel basis to generate a flat fielded image.

In some embodiments, a method for generating an image corrected for a non-uniformity, can comprise: calculating a relative illumination of an imaging lens of a plurality of pixels on an imaging sensor; inverting the relative illumination to generate a flat fielding matrix; providing the flat fielding matrix to a user; wherein the user can multiply a captured image of a biological sample by the value of the flat fielding matrix on a pixel-to-pixel basis to generate a flat fielded image. A user can obtain a captured image using the imager prior to flat fielding the image using the flat-fielding matrix. In some embodiments, a user can choose to generate the image corrected for non-uniformity. In some embodiments, a user can be instructed to generate the image corrected for non-uniformity by providing the user with a pre-calculated value of a flat fielding matrix and instructing the user to multiply a captured image of a biological sample by the value of the flat fielding matrix on a pixel-to-pixel basis to generate a flat fielded image. In some embodiments, an imaging device or imaging software manufacturer can provide a flat fielding matrix to a user. In some embodiments, a user can calculate the value of a flat-fielding matrix using the present methods and algorithms.

In one embodiment, a method for generating an image corrected for a non-uniformity, comprising: calculating a relative illumination of an imaging lens of a plurality of pixels on an imaging sensor; inverting the relative illumination to generate a flat fielding matrix. For example an imaging device manufacturer or user can generate a flat fielding matrix for a future use.

A flat fielded image, obtained by methods of the present disclosure, displays a correct ratio of a signal level of each captured image of the biological sample irrespective of its location on an imaging surface, imaging area or field of view. A flat fielded image is an image that has been corrected for a non-uniformity.

Example of Flat Fielding Calibration

One exemplary application mode for an imager or an imaging system of the present disclosure is use as an imager for imaging biomolecules (e.g., but not limited to proteins and nucleic acids in gels or blots) in a chemiluminescence mode where the chemiluminescence sample emits light without external illumination and excitation. As noted in sections above, one problem faced while performing chemiluminescence imaging is non-uniformity of image, wherein when a chemiluminescence sample is placed at different locations of an imaging surface (such as, part 110 in FIG. 1, an imaging area, a field of view, a sample screen or sample tray), the image signal is different, even for the same sample (such as the same protein or nucleic band in a gel or a blot).

Figure 15:
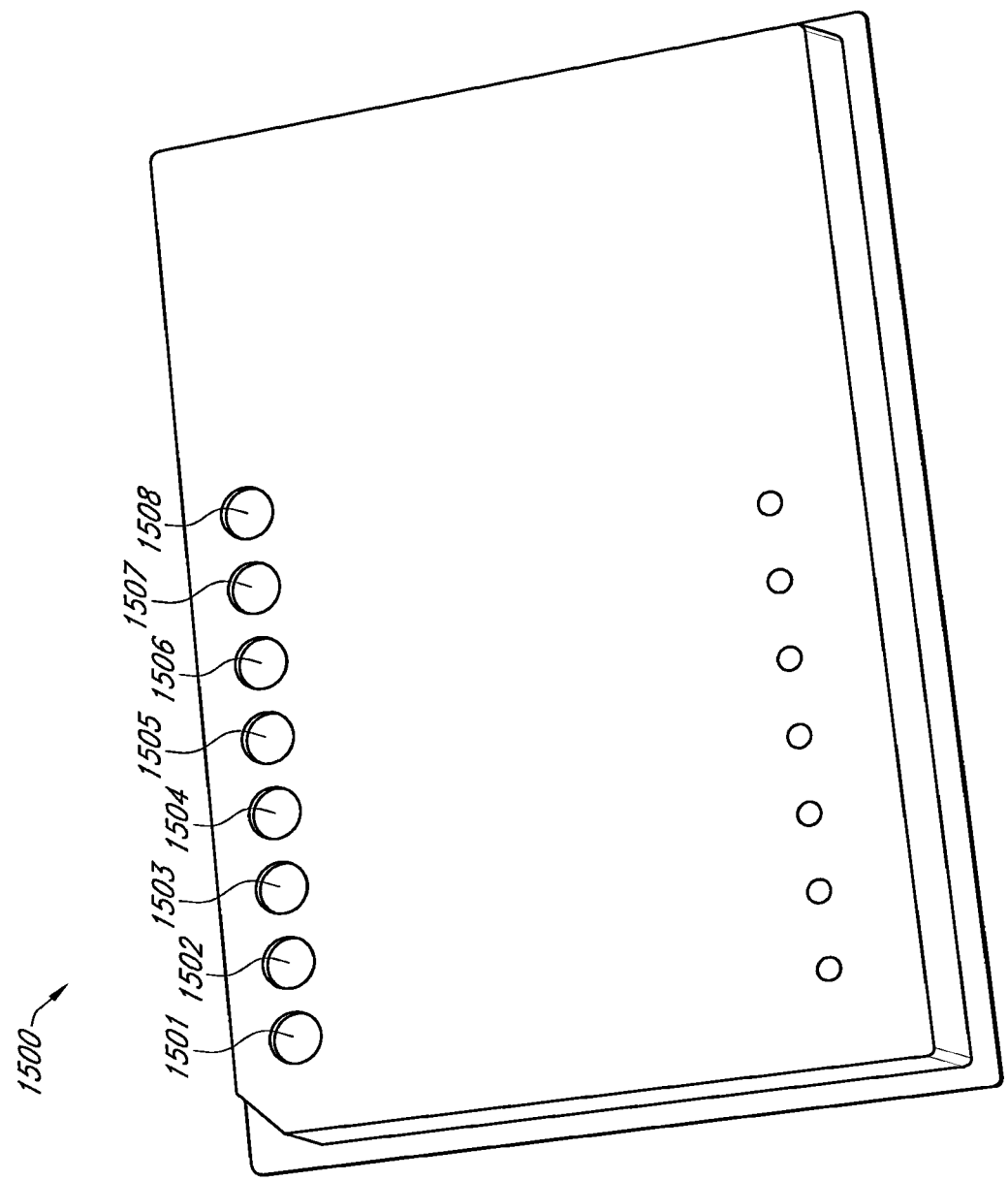
FIG. 15 illustrates a perspective view of a luminometer reference plate.

This problem is illustrated by using a luminometer reference microplate. In one example, FIG. 15 illustrates a perspective view of a luminometer reference plate 1500. However, any luminometer reference plate known in the art may be used to illustrate this problem. Luminometer reference plate 1500 has one or more radiation spots. Eight radiation spots are shown on luminometer 1500 numbered 1501-1508. Radiation was blocked from seven of the radiation spots (e.g., 1501-1507). Only one (e.g., the brightest) spot 1508 was imaged on different locations of the imaging surface (on the diagonal of the imaging screen). Spot 1508 of luminometer reference plate 1500 was placed at different locations on the field of view (or sample screen). Images were taken of spot 1508 of luminometer 1500 with a constant exposure time on various parts of the imaging surface and the images were stacked.

Figure 16A:
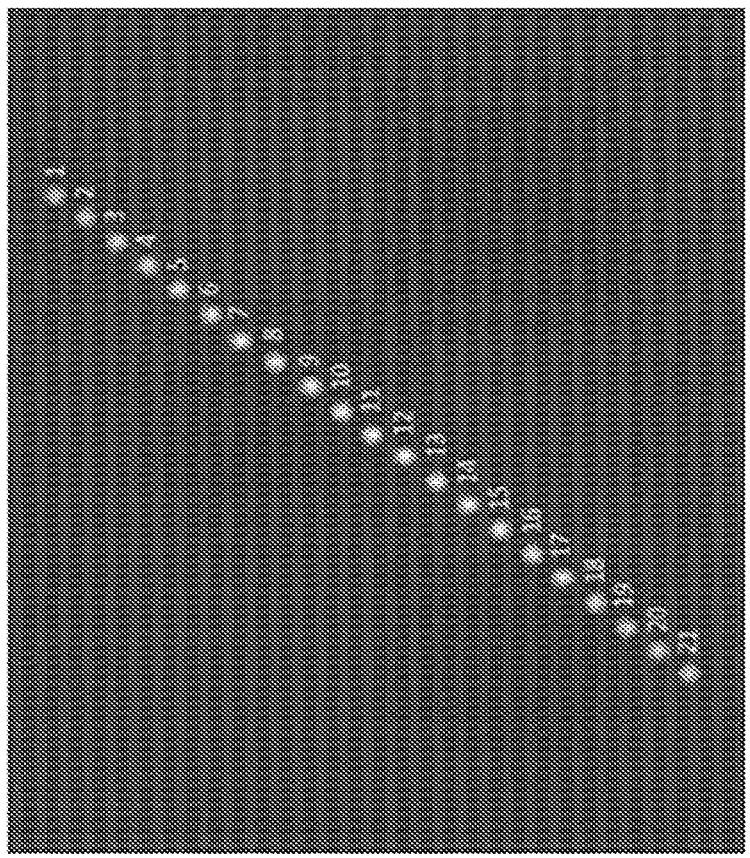
FIG. 16A illustrates the stacked images of one light spot of the luminometer reference plate in different locations on the field of view.
Figure 16B:
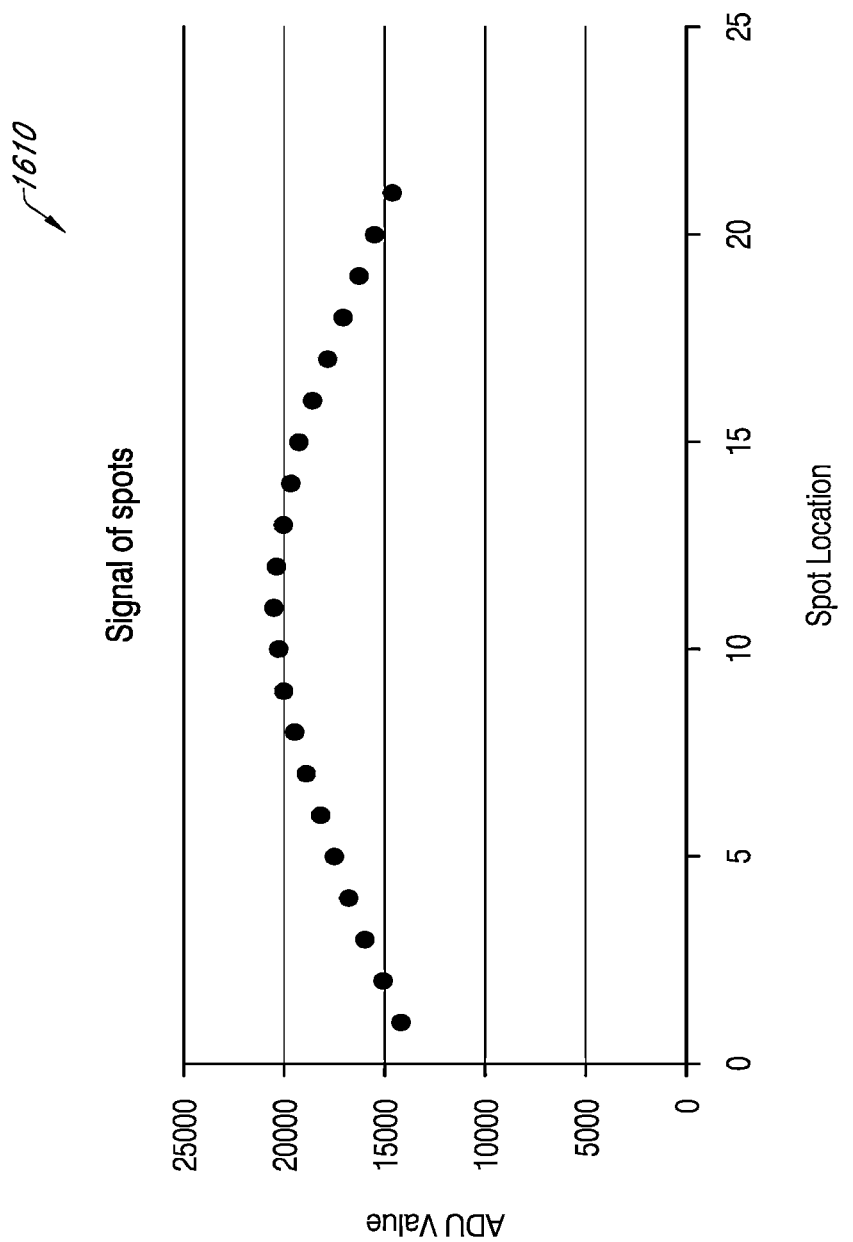
FIG. 16B illustrates a graph showing the signal of the same spot in different locations.

FIG. 16A illustrates the stacked images 1600 of spot 1508 of luminometer 1500. FIG. 16B illustrates a graph 1610 showing the signal of spot 1508 taken at various locations on the imaging surface of an imager of the present disclosure, according to an embodiment. Graph 1610 of FIG. 16B shows that the signals from the same spot 1508 appear to be of different intensities at different locations on the imaging screen, even though all signals are identical since they are emitted by the same emitting spot 1508 on luminometer 1500. As shown in FIGS. 16A and 16B, identical signals from a chemiluminescence sample appear to be different due to being imaged on different locations of an imaging screen/sample screen. This signal difference due to location is due to a characteristic of an imaging lens i.e., relative illumination. In view of the non-uniformity of images, it is not possible for a user to determine if differences in imaging are due to differences in concentration of a biomolecule (protein, nucleic acid, DNA, etc.) in a band of a luminescent sample or if signal differences are due to the sample band being imaged at a different location on sample screen. Hence, reliable and accurate quantitative information cannot be obtained by current imaging methods.

The signal difference described above can be due to relative illumination of the imaging lens in an imaging system of the present disclosure. Relative illumination is a way of representing the combined effect of vignetting and roll-off in an imaging lens, and is generally given as a percentage of illumination at any point on the sensor, normalized to the position in the field with maximum illumination. Vignetting and roll-off are two separate components of relative illumination. Because the signal difference described above is due to the relative illumination (i.e., one of the characteristics of the imaging lens), the difference can be corrected if the relative illumination is known. The correction process involves creating flat fielding master matrix file based on relative illumination data of imaging lens, normalizing the flat field master matrix based on the maximum value in the matrix and applying this flat fielding (FF) master matrix to a captured image from the system.

Figure 17:
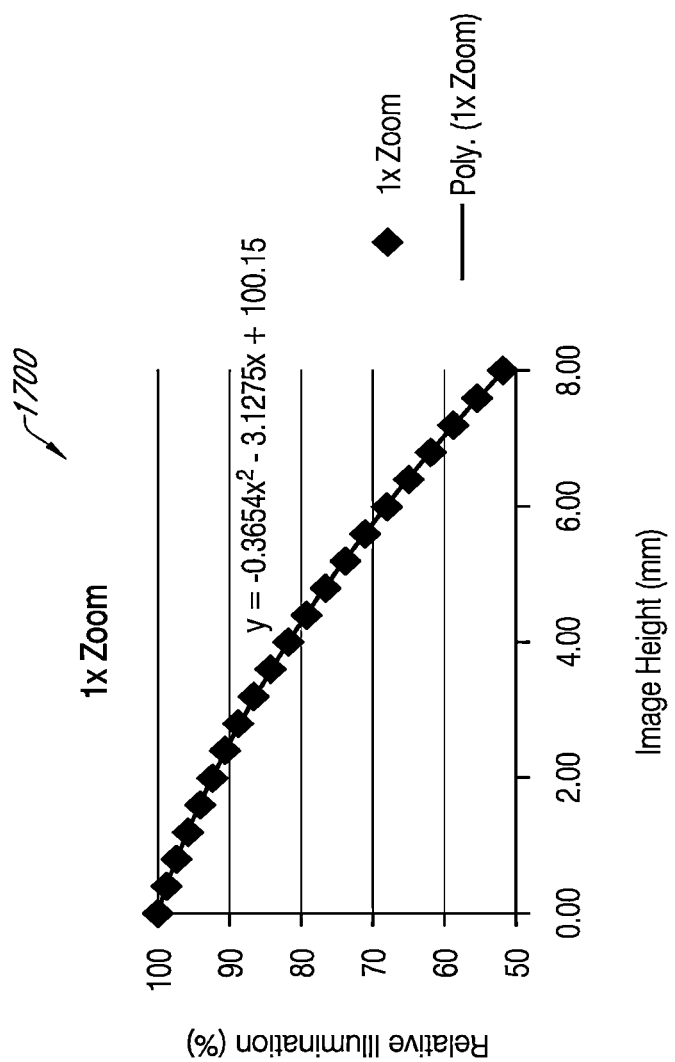
FIG. 17 illustrates a graph showing relative illumination of an imaging lens within an imaging system and best fit result from a non-linear regression, according to an embodiment.

FIG. 17 illustrates a graph 1700 showing relative illumination of an imaging lens of the present disclosure, according to one embodiment. The equation for the curve in the graph 1700 can be obtained through a linear or non-linear curve fitting regression. With discrete data points, a regression method is applied to fit the curve to a series of points in order to find the best fit equation. Then, the relative illumination number can be calculated at any position on imaging sensor using the identified equation. In one embodiment of the present disclosure, an algorithm of flat fielding includes the following steps:

Step 1—Calculating the relative illumination number of all pixels on the imaging sensor based on the equation identified from a curve fit regression;

Step 2—Inverting the numbers in step 1 and normalize the inverted numbers based on the maximum value among the inverted numbers to generate flat fielding master matrix; and Step 3—Upon image acquisition, multiplying the captured image of a biological sample by the value in the matrix created in step 2 on a pixel-to-pixel basis to generate a final image applied with flat fielding.

The image after flat fielding shows the correct ratio of signal level of all bands in a sample.

Figure 18A:
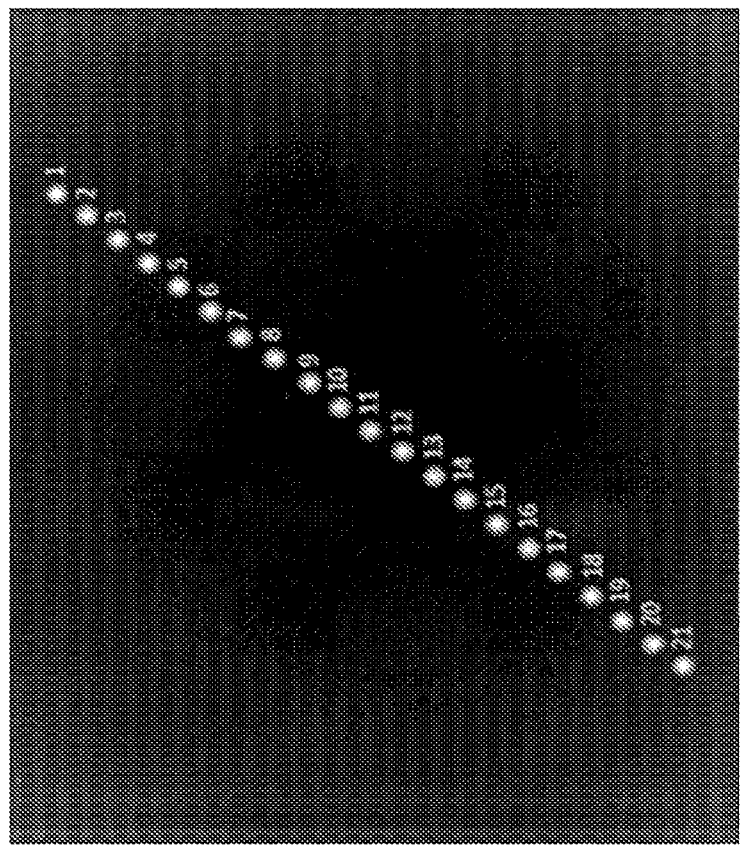
FIG. 18A illustrates the modified image of FIG. 16A with application of the flat fielding master matrix.
Figure 18B:
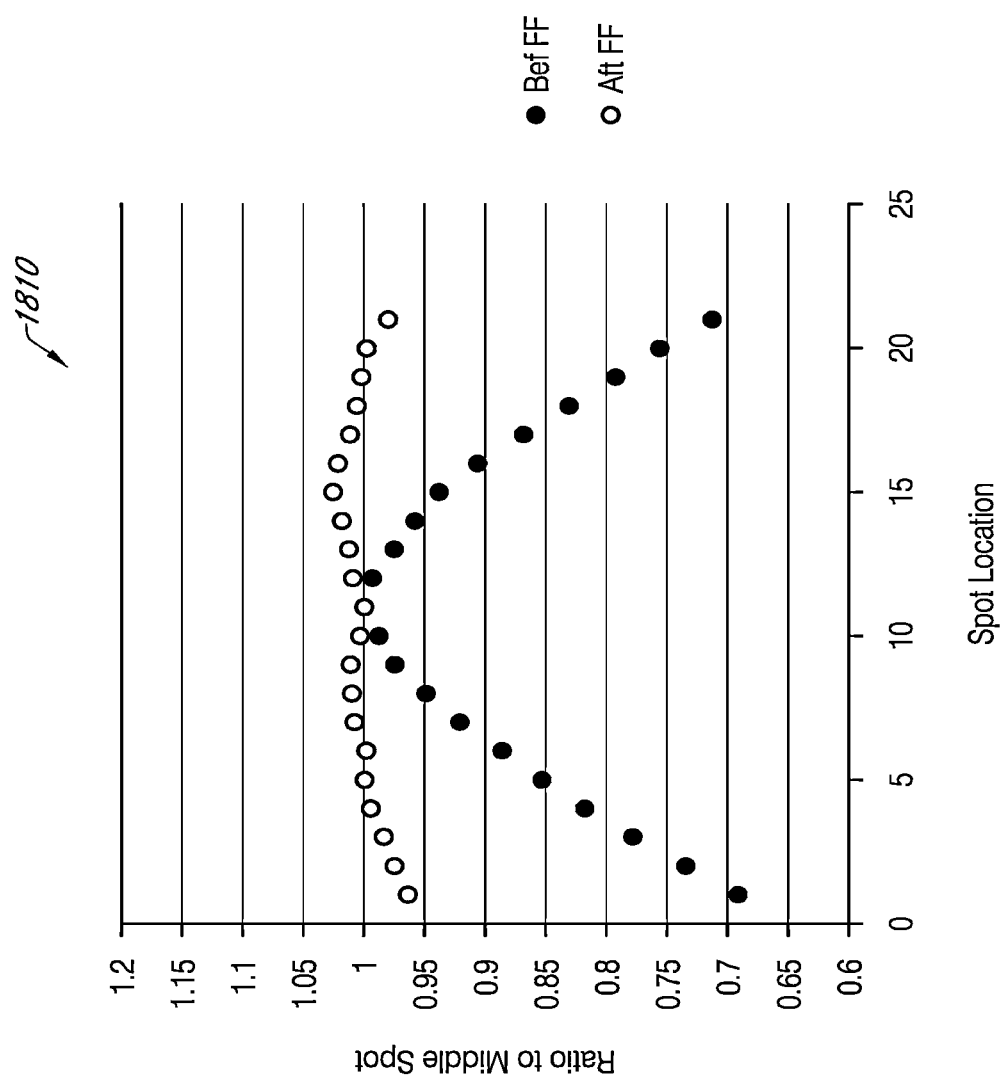
FIG. 18B illustrates a graph showing a ratio of intensity of spots over the spot of maximum intensity in FIG. 18A, according to an embodiment.

FIG. 18A illustrates image 1800 from FIG. 16A after flat fielding, and FIG. 18B illustrates a graph 1810 showing a ratio of intensity of spots over the central spot in FIG. 18A, according to an embodiment. In other words, FIG. 18B shows the relative percentage of those spots before and after flat fielding. As shown, the ratio of individual spot intensity over the spot with maximum intensity value (FIG. 18A) before applying flat fielding can be about 0.7, whereas the ratio is increased to be greater than 0.95 after flat fielding. As such, there is significant intensity compensation after flat fielding application.

Figure 19A:
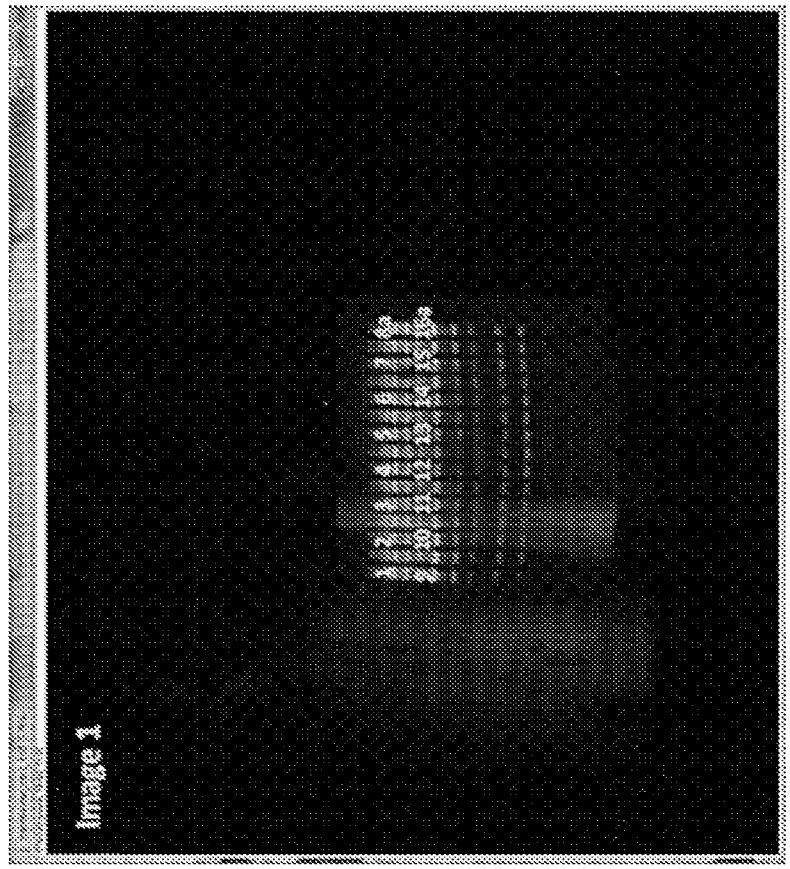
FIG. 19A illustrates an image of a chemiluminescence sample at 1× zoom level in the middle of the field of view.
Figure 19B:
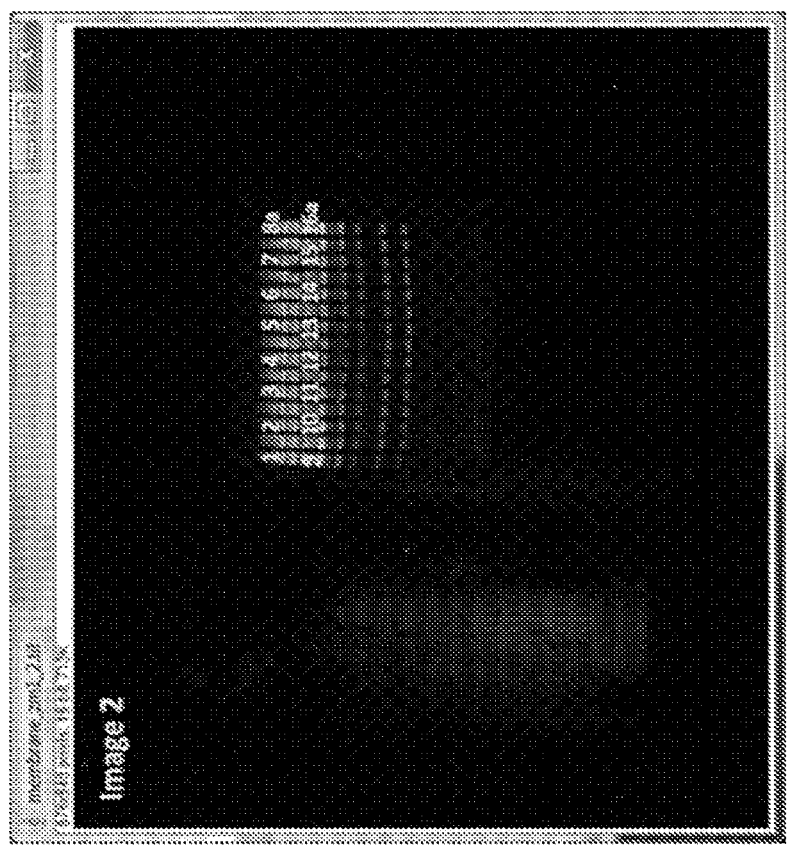
FIG. 19B illustrates an image of the chemiluminescence sample at 1× zoom level at a position between the middle and the top right diagonal position of the field of view, according to an embodiment.
Figure 19C:
FIG. 19C illustrates an image of the chemiluminescence sample at 1× zoom level at the top right diagonal position of the field of view.

FIG. 19A illustrates an image 1900 of a chemiluminescence sample at 1× zoom level at a middle position of the field of view, FIG. 19C illustrates an image 1910 of the chemiluminescence sample at 1× zoom level at a top right position of the field of view, and FIG. 19B illustrates an image 1920 of the chemiluminescence sample at 1× zoom level at a position between the middle and the top right positions of the field of view, according to an embodiment.

Figure 20A:
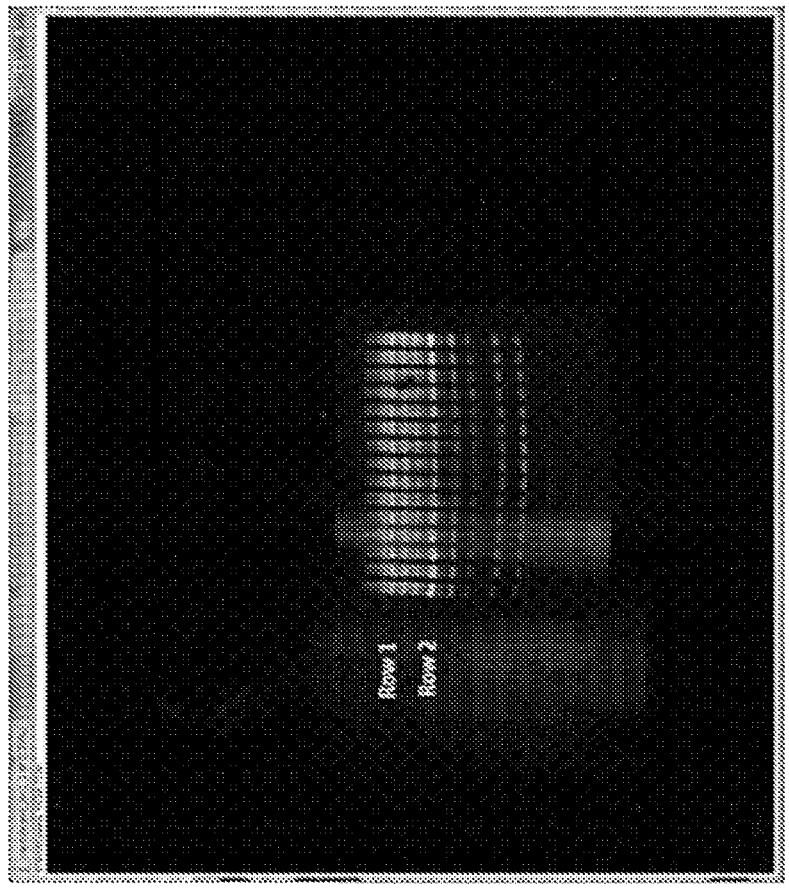
FIG. 20A illustrates an image showing two rows of bands that are quantified.
Figure 20B:
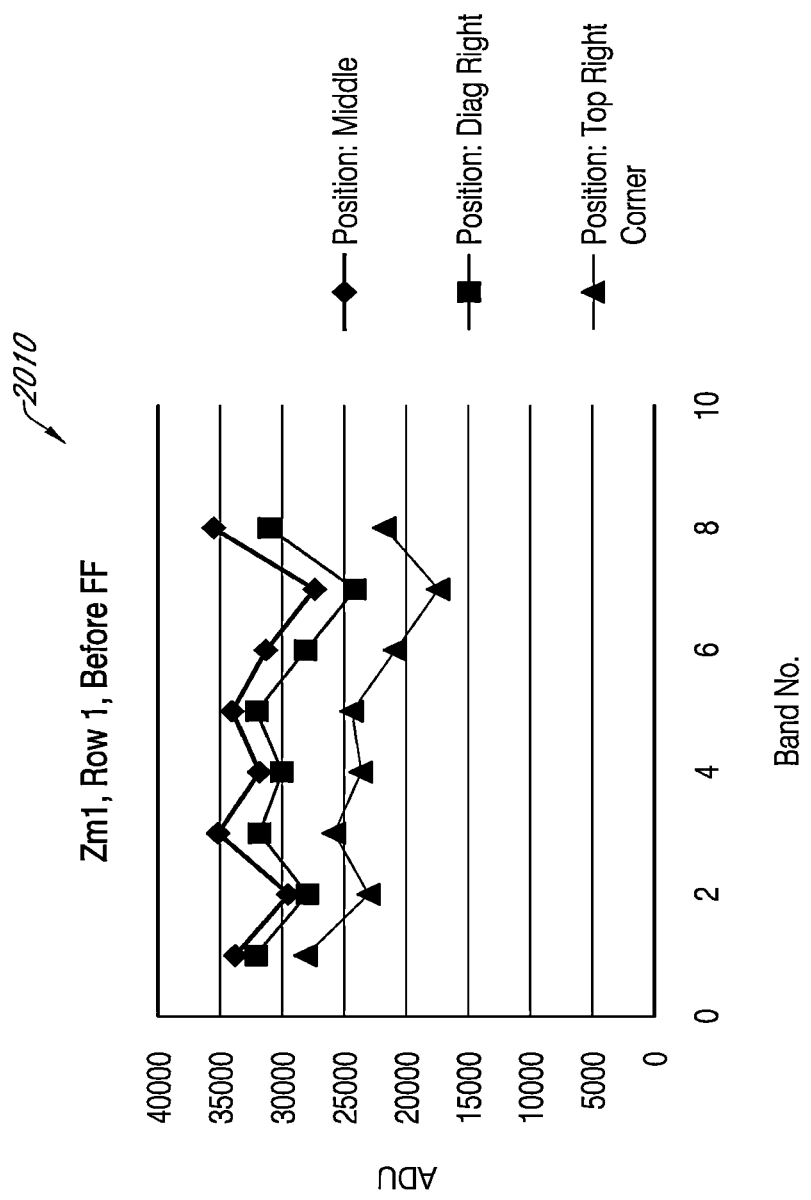
FIG. 20B illustrates a graph showing the intensity of the bands of FIG. 20A on the first row before flat fielding.
Figure 20C:
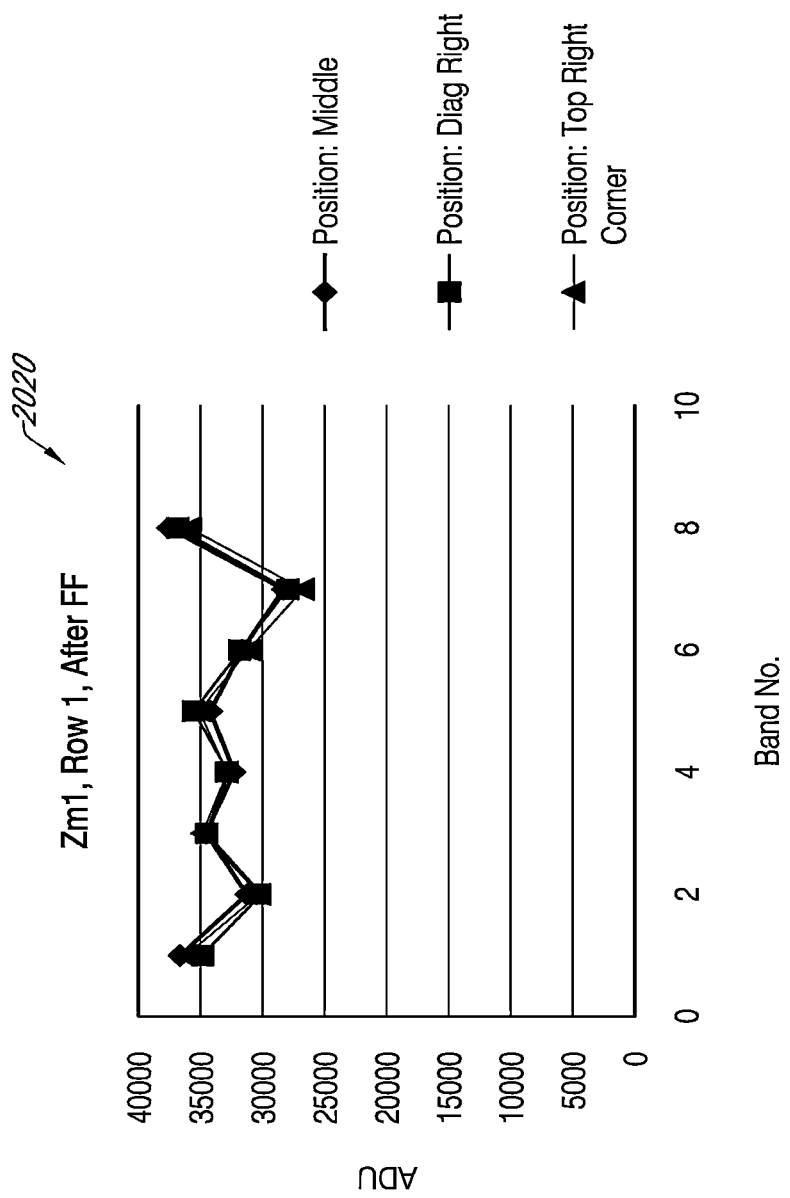
FIG. 20C illustrates a graph showing the intensity of the bands on the first row of FIG. 20A after flat fielding.
Figure 20D:
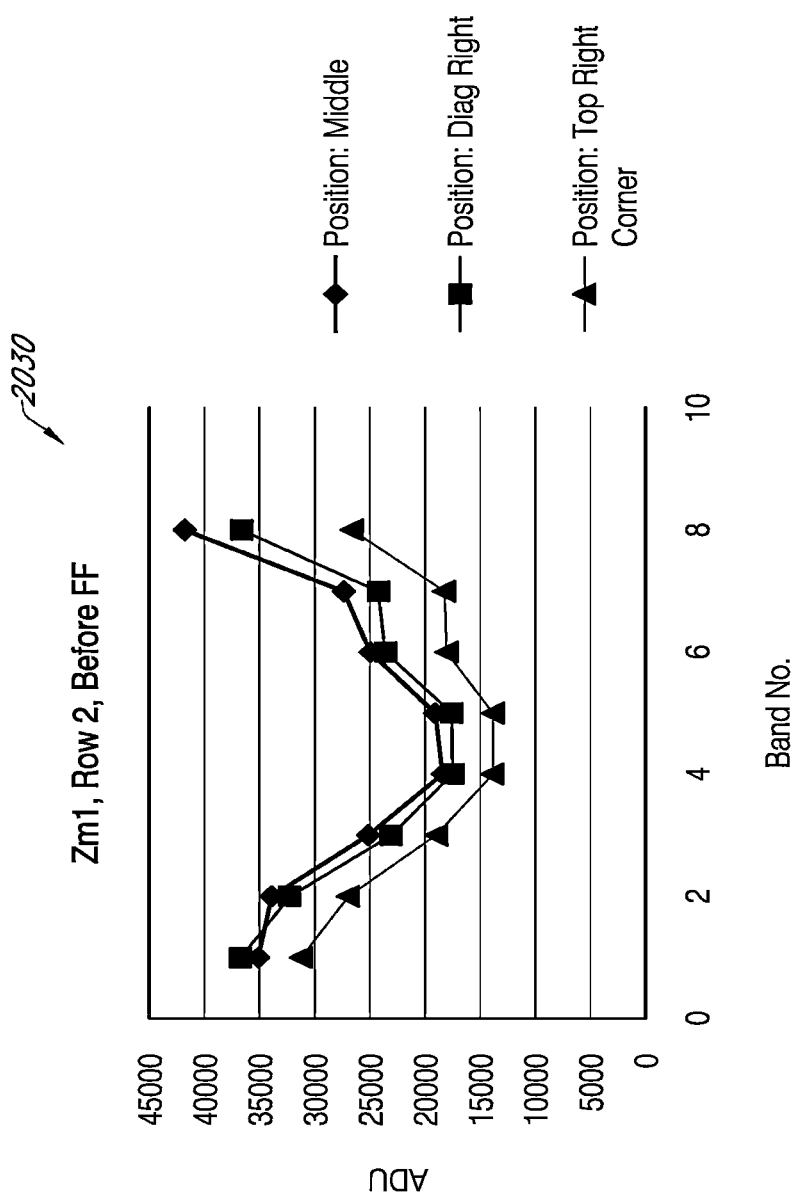
FIG. 20D illustrates a graph showing the intensity of the bands on the second row of FIG. 20A before flat fielding.
Figure 20E:
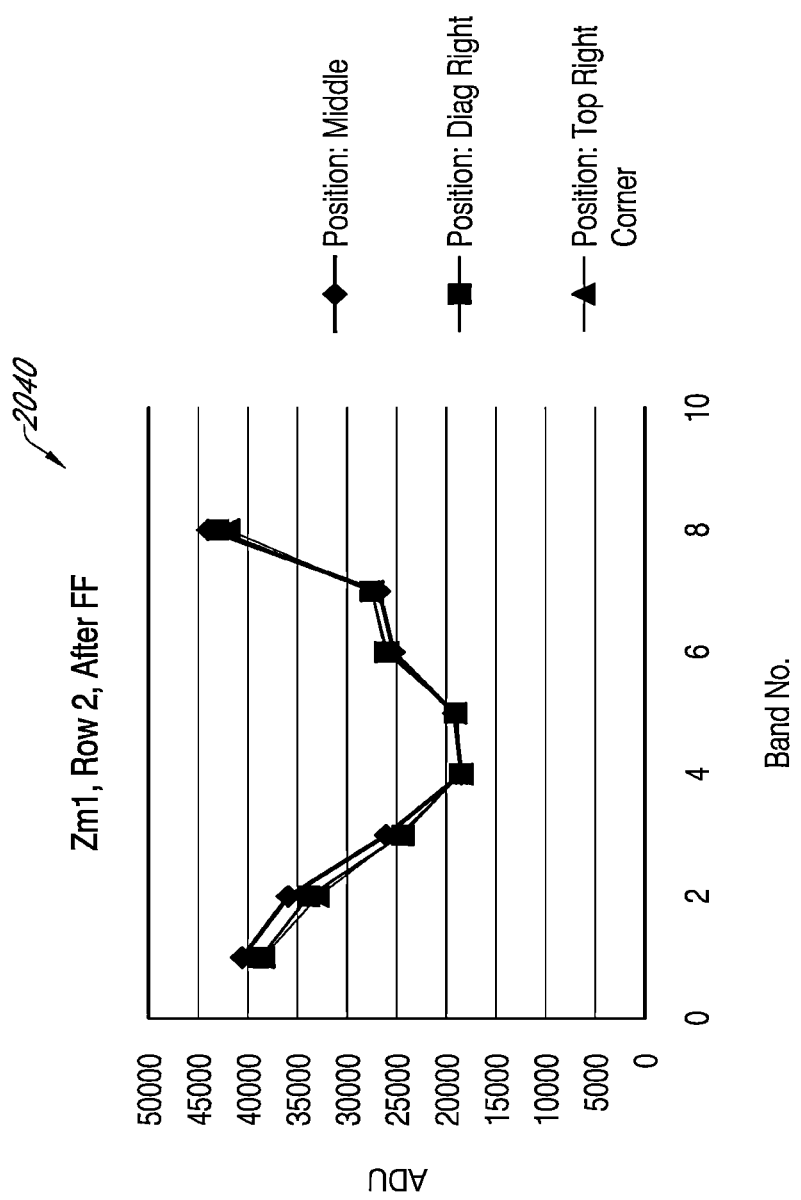
FIG. 20E illustrates a graph showing the intensity of the bands on the second row of FIG. 20A after flat fielding, according to an embodiment.

FIG. 20A illustrates an image 2000 showing two rows of bands that are quantified, FIG. 20B illustrates a graph 2010 showing the intensity of the hands on the first row before flat fielding, FIG. 20C illustrates a graph 2020 showing the intensity of the bands on the first row after flat fielding, FIG. 20D illustrates a graph 2030 showing the intensity of the bands on the second row before flat fielding, and FIG. 20E illustrates a graph 2040 showing the intensity of the bands on the second row after flat fielding, according to an embodiment. As seen, the intensity of the individual band changes with the location of sample on the imaging surface (with identical sample), whereas, after flat fielding, the intensity does not vary with location on the imaging surface.

Generating a Flat Fielding (FF) Master

FIG. 21A illustrates Table 2100 showing relative illumination of imaging lens against image height on a detection sensor with a 1× zoom, and FIG. 21B illustrates Table 2110 showing relative illumination of a CCD sensor imaging lens against image height with a 2× zoom, according to an embodiment.

Figure 22:
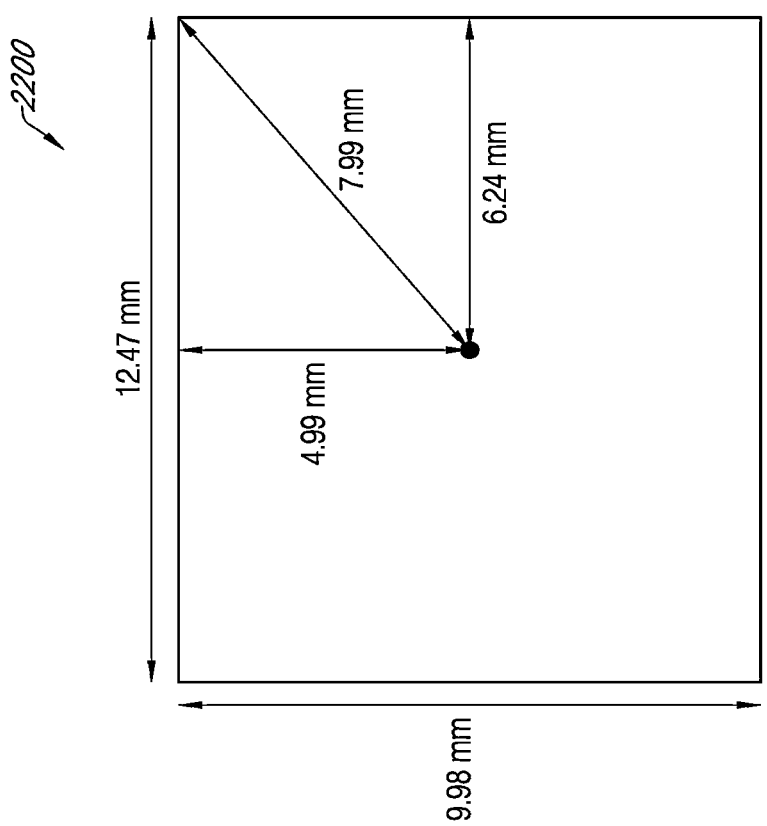
FIG. 22 illustrates a plot showing that relative illumination is symmetrical with respect to the center of the CCD, according to an embodiment.

FIG. 22 illustrates a plot 2200 showing that relative illumination is symmetrical with respect to the center of the image sensor, according to an embodiment. The maximum image height is about 8 mm. Simulations were run from 0 mm to 8 mm.

Figure 23A:
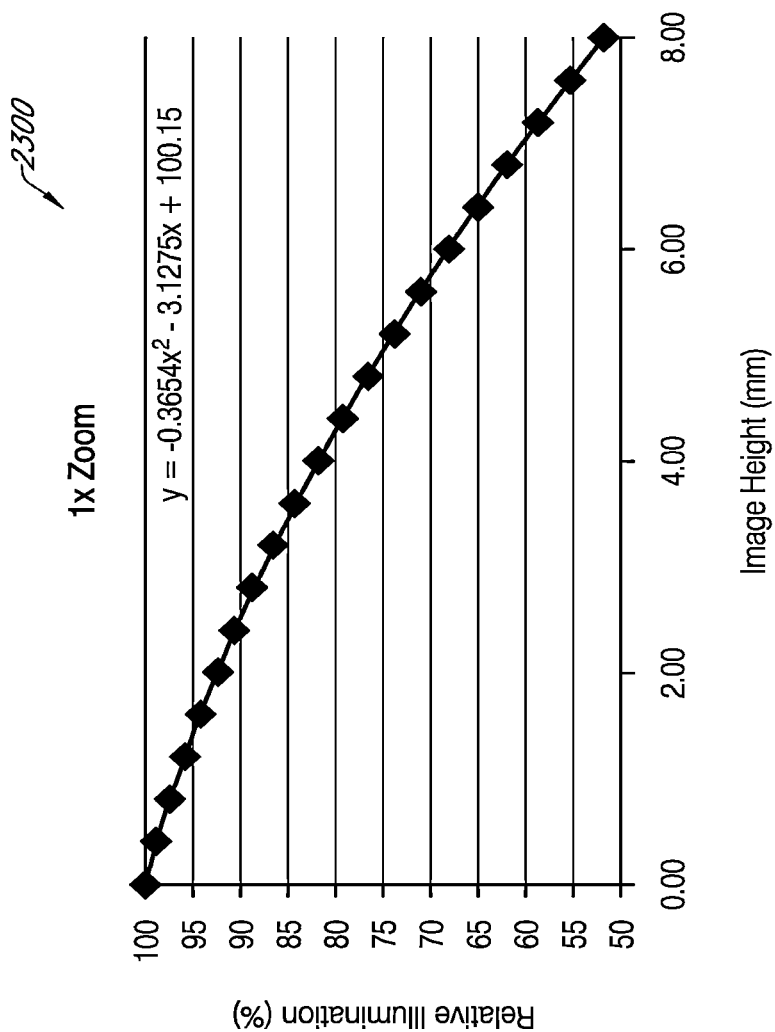
FIG. 23A illustrates a graph showing a best fit non-linear regression curve with a 1× zoom.
Figure 23B:
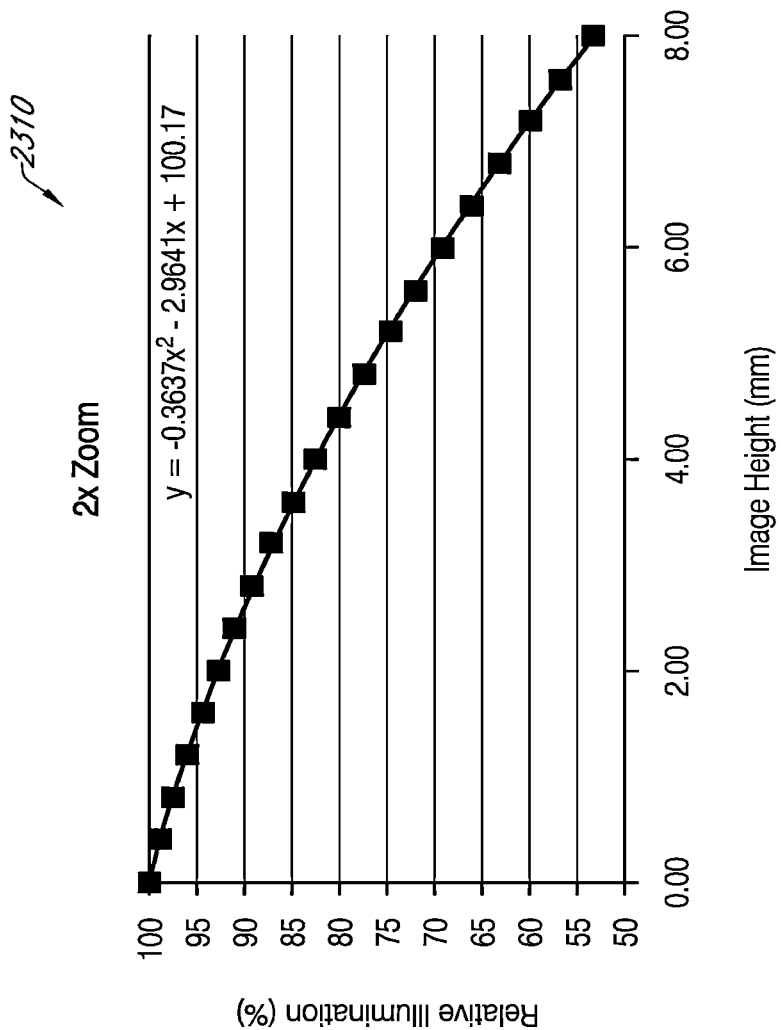
FIG. 23B illustrates a graph showing a best fit non-linear regression curve with a 2× zoom, according to an embodiment.

FIG. 23A illustrates a graph 2300 showing a best fit curve with a 1× zoom, and FIG. 23B illustrates a graph 2310 showing a best fit curve with a 2× zoom, according to an embodiment. The curves may be a first degree polynomial, a second degree polynomial, a third degree polynomial, or the like. Image height is calculated from this equation:

$$h=\sqrt{(x-x_c)^2+(y-y_c)^2} \times \text{pixel height}$$

where h represents the height (in mm) from the center pixel of the detection sensor, $x_c$ represents the x-coordinate of the center pixel, and $y_c$ represents the y-coordinate of the center pixel. The pixel height in this example is 3.69 μm/pixel. Given this, for a 1× zoom, relative illumination can be calculated from the equation of the best fit curve:

$$RI=-0.3654h^2-3.1275h+100.15$$

Where RI represents the relative illumination (%), $0 \leq RI \leq 100$.

For Bin 1×1 image:

Width=3360 pixels→$x_c$=1690

Height=2704 pixels→$y_c$=1352

For pixel (1,1)

$$h=\sqrt{(1-1690)^2+(1-1352)^2} \times 3.69 \text{ μm}=7.98 \text{ mm}.$$

$$RI=-0.3654 \times 7.98092^2-3.1275 \times 7.98092+100.15=51.9\%$$

Figure 24:
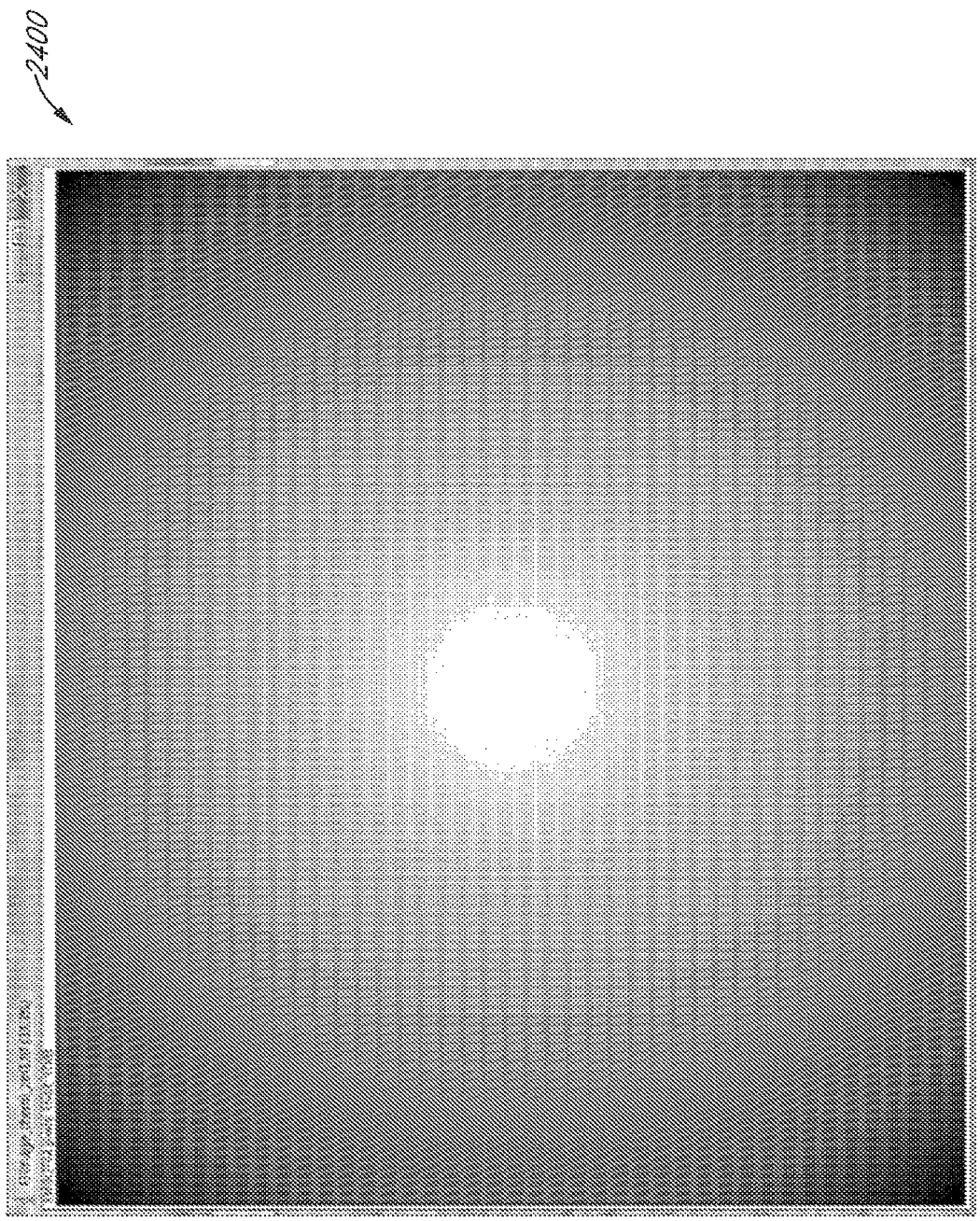
FIG. 24 illustrates a simulation image at a 1× zoom, according to an embodiment.

FIG. 24 illustrates a simulation image 2400 at a 1× zoom, according to an embodiment.

Figure 25:
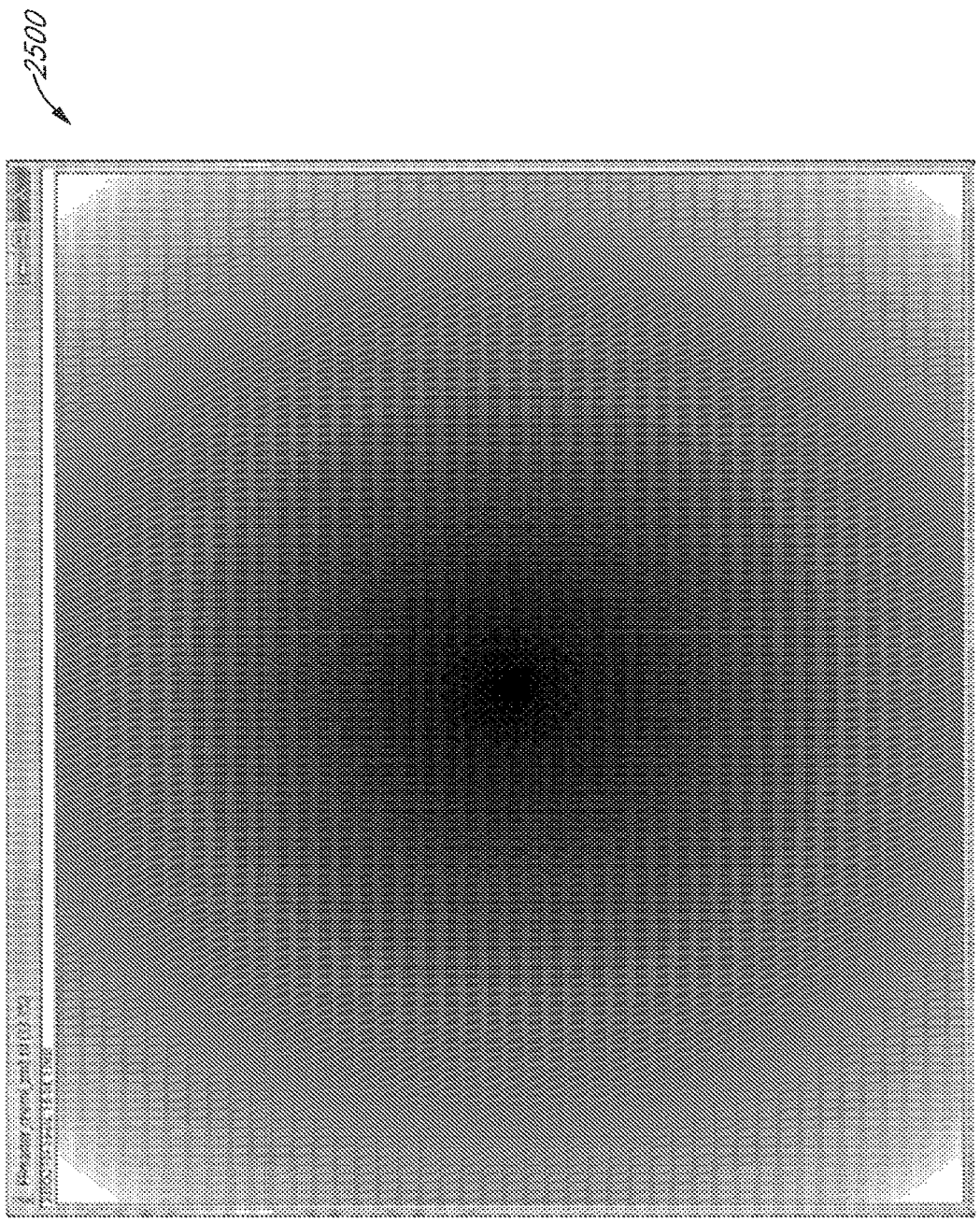
FIG. 25 illustrates a flat fielding master image, according to an embodiment.

FIG. 25 illustrates a flat fielding master image 2500, according to an embodiment. The value of each pixel in the master image may equal $RI^{-1}$.

Application of Flat Fielding Master Images

Figure 26A:
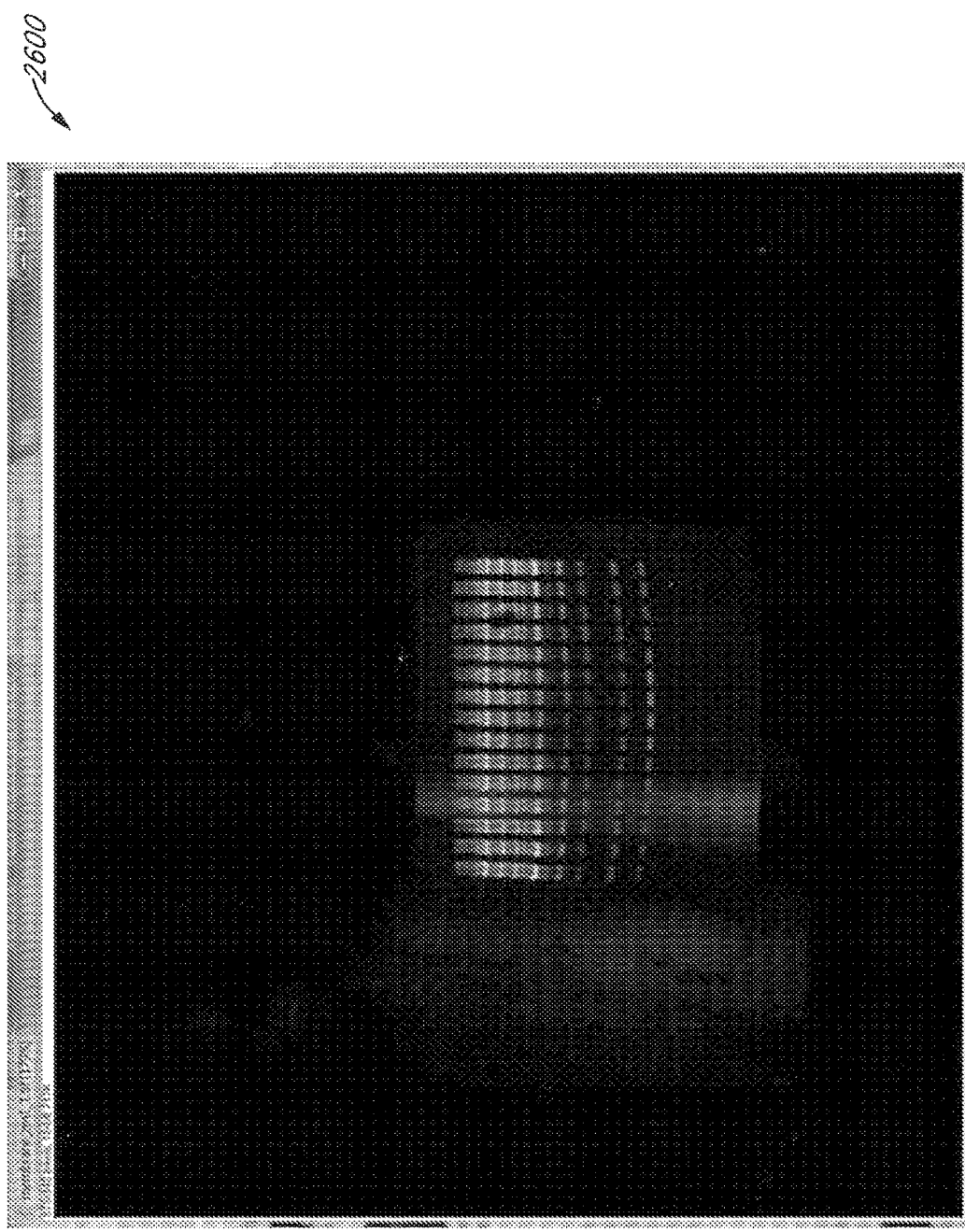
FIGS. 26A, 26B, and 26C are images after applying flat fielding.
Figure 26B:
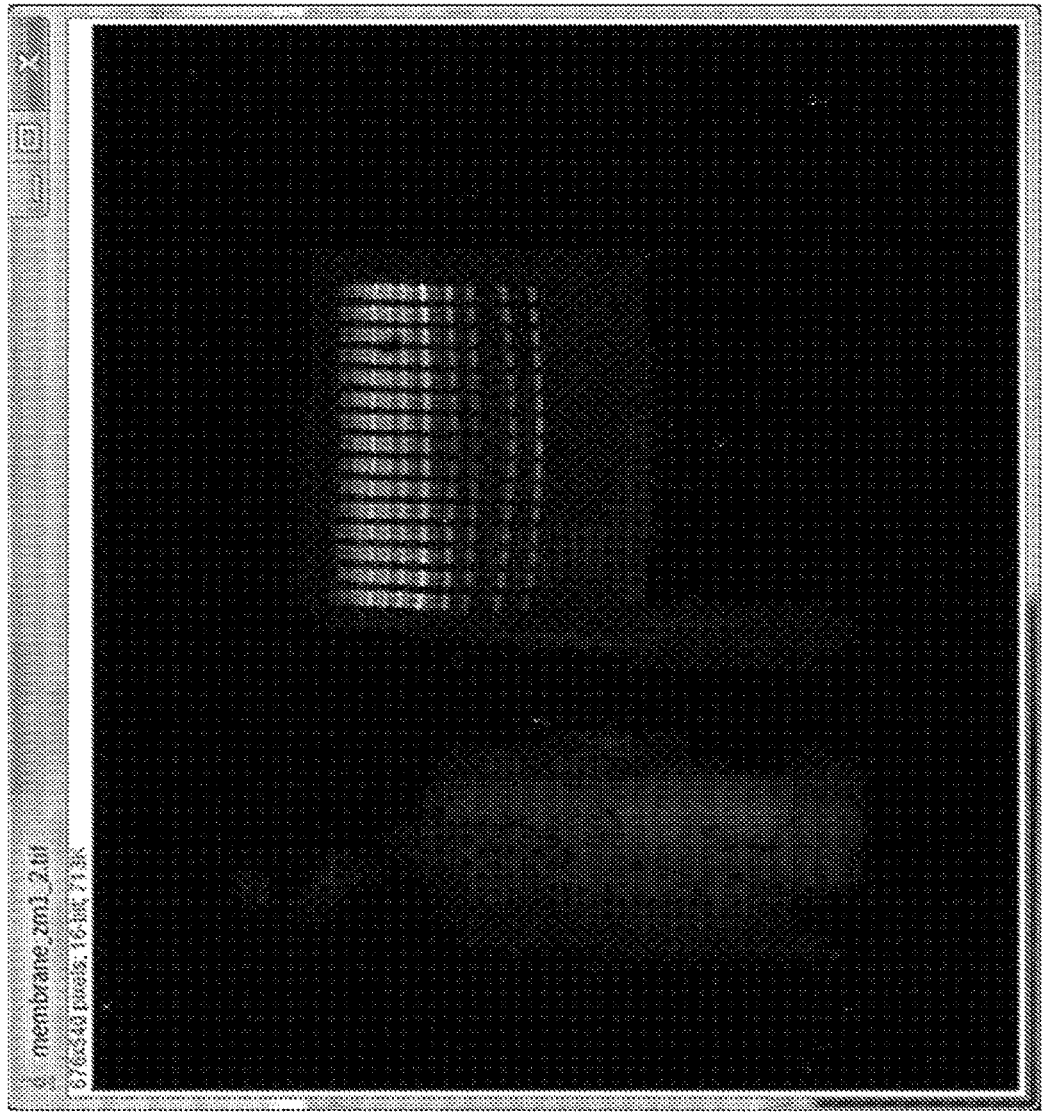
Figure 26C:
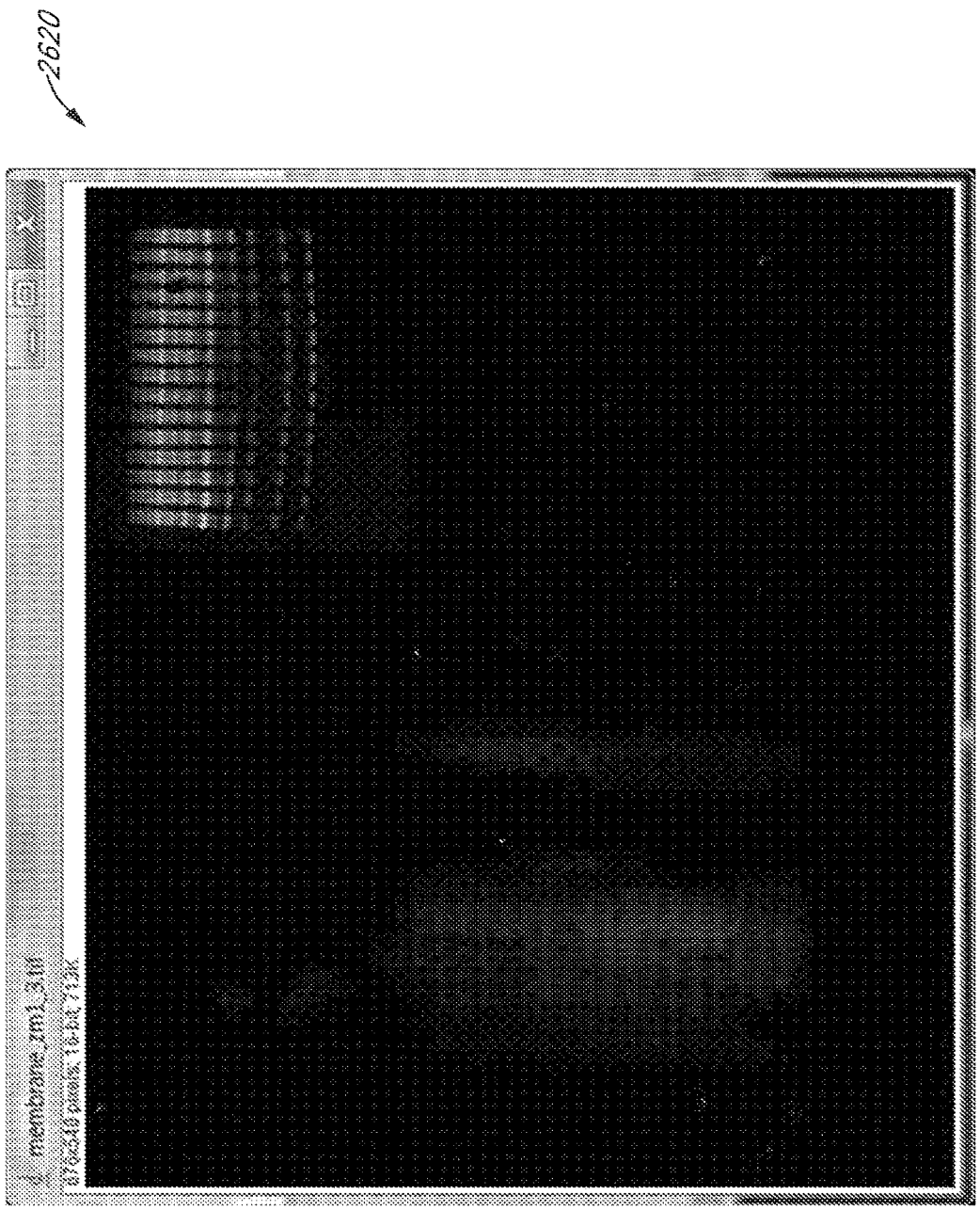

FIG. 26A illustrates an image 2600 with a sample at a middle position on the field of view with a 1× zoom, FIG. 26C illustrates an image 2610 with the sample at a top right position of the field of view with a 1× zoom, and FIG. 26B illustrates an image 2620 with the sample between the middle and top right positions in the field view, according to an embodiment. In this example, the sample is a western blot membrane with equal amount of protein visualized with chemiluminescent substrate, the bin number is 5, the zoom may be 1× or 2×, the gain is high (e.g., 55), and the expiration time is 60 seconds.

The flat field master matrix has been applied to the images in FIGS. 26A-26C. Rectangular masks were drawn over selected bands, and the mean pixel intensity was measured. A macro was used to ensure that the measured area selected for each band is at the same position for the images before applying flat fielding master matrix and after applying flat fielding master matrix. Although the western blot membrane was prepared with samples having equal protein amount, there was still a variance in signal value between different bands. For each individual band, the signal intensity should be similar in the same row regardless of membrane position.

Figure 27:
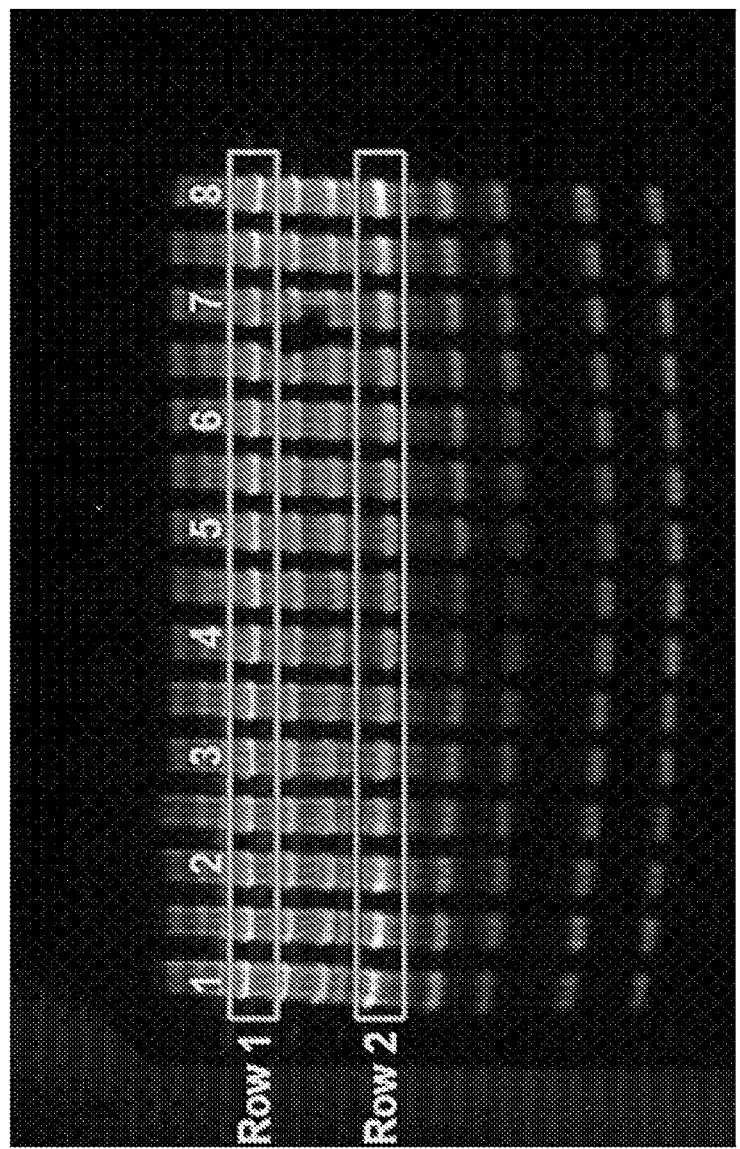
FIG. 27 illustrates an image showing two rows of eight bands each, according to an embodiment.

FIG. 27 illustrates an image 2700 showing two rows of eight sample bands each, according to an embodiment.

Figure 28A:
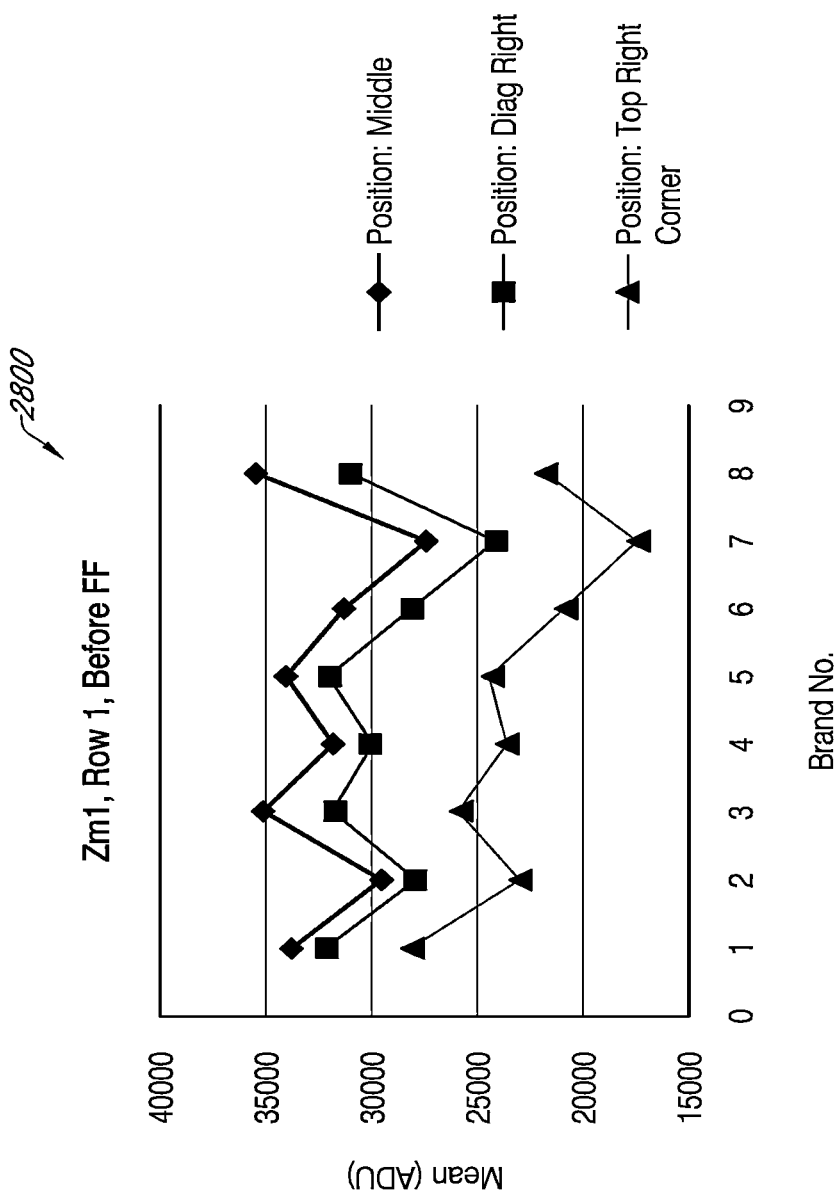
FIG. 28A illustrates a graph showing the first row of FIG. 27 taken at 1× zoom before flat fielding.
Figure 28B:
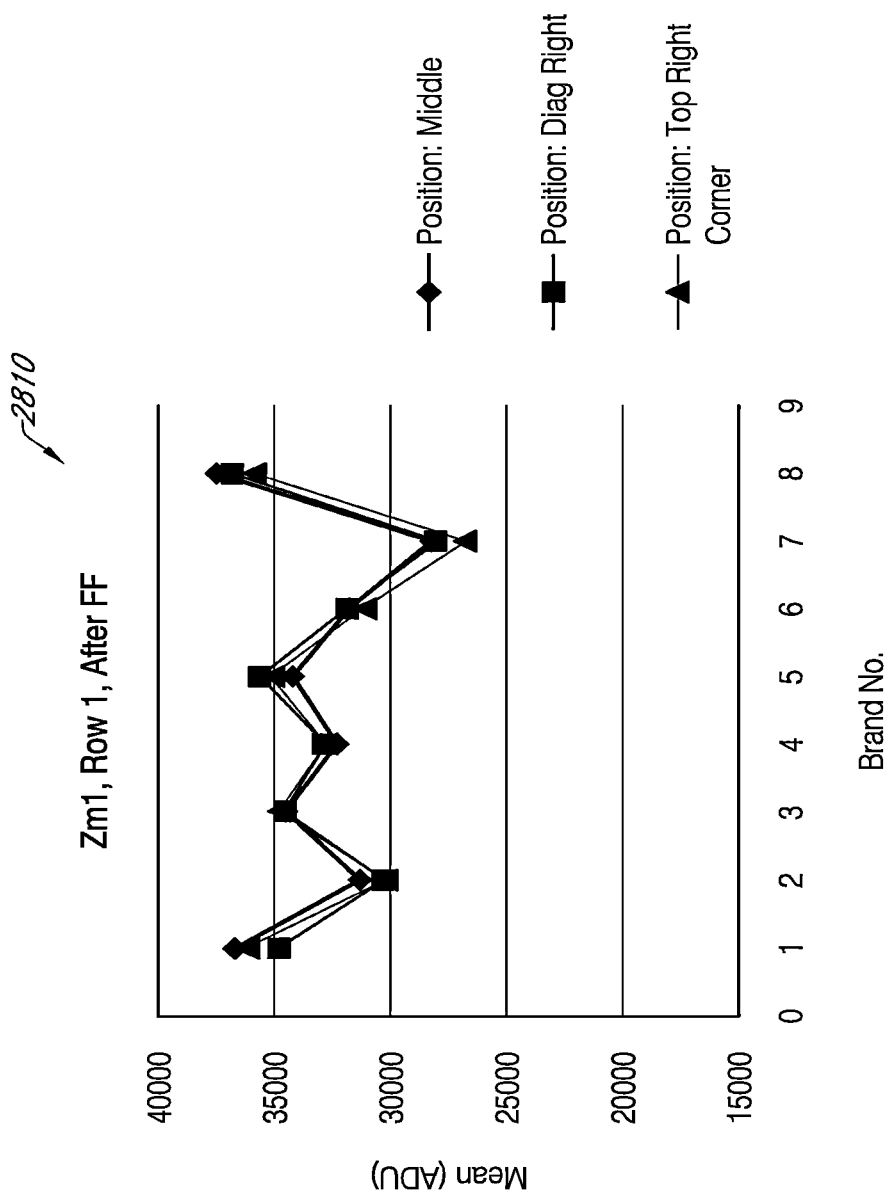
FIG. 28B illustrates a graph showing the first row of FIG. 27 taken at 1× zoom after flat fielding.
Figure 28C:
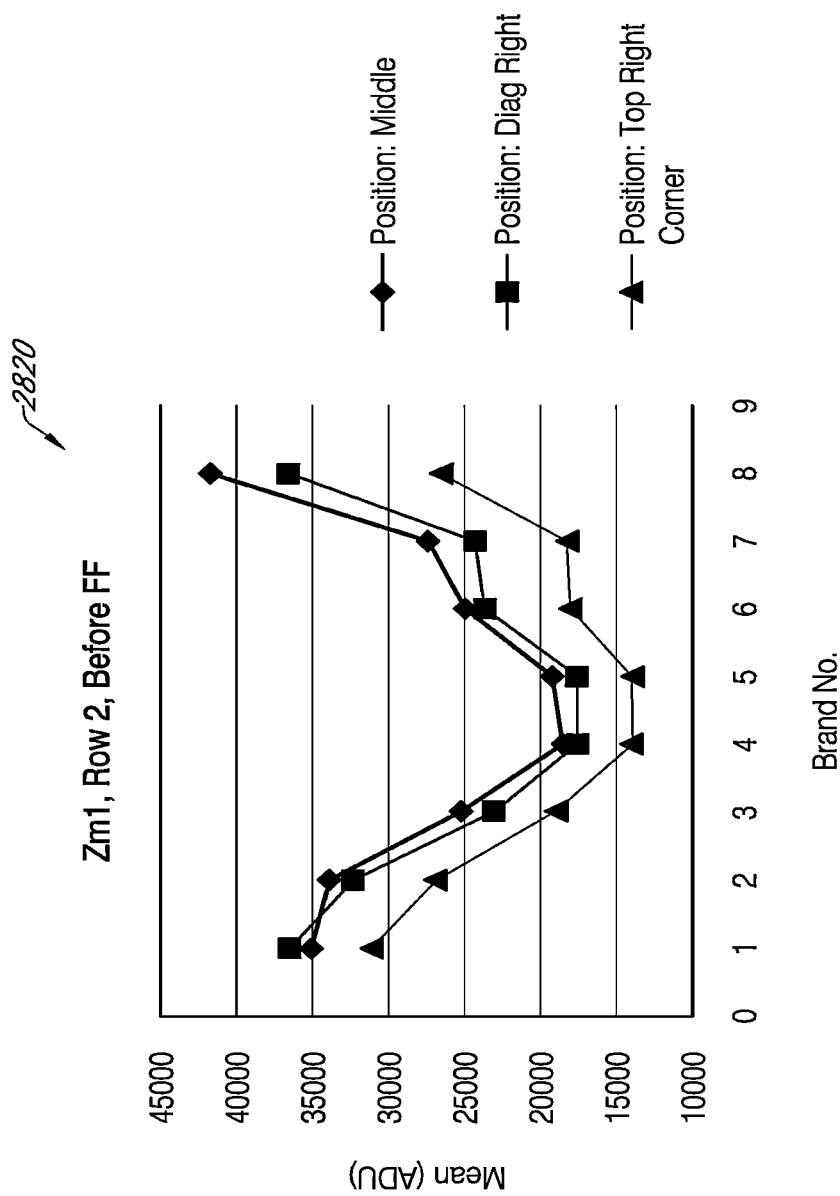
FIG. 28C illustrates a graph showing the second row of FIG. 27 taken at 1× zoom before flat fielding.
Figure 28D:
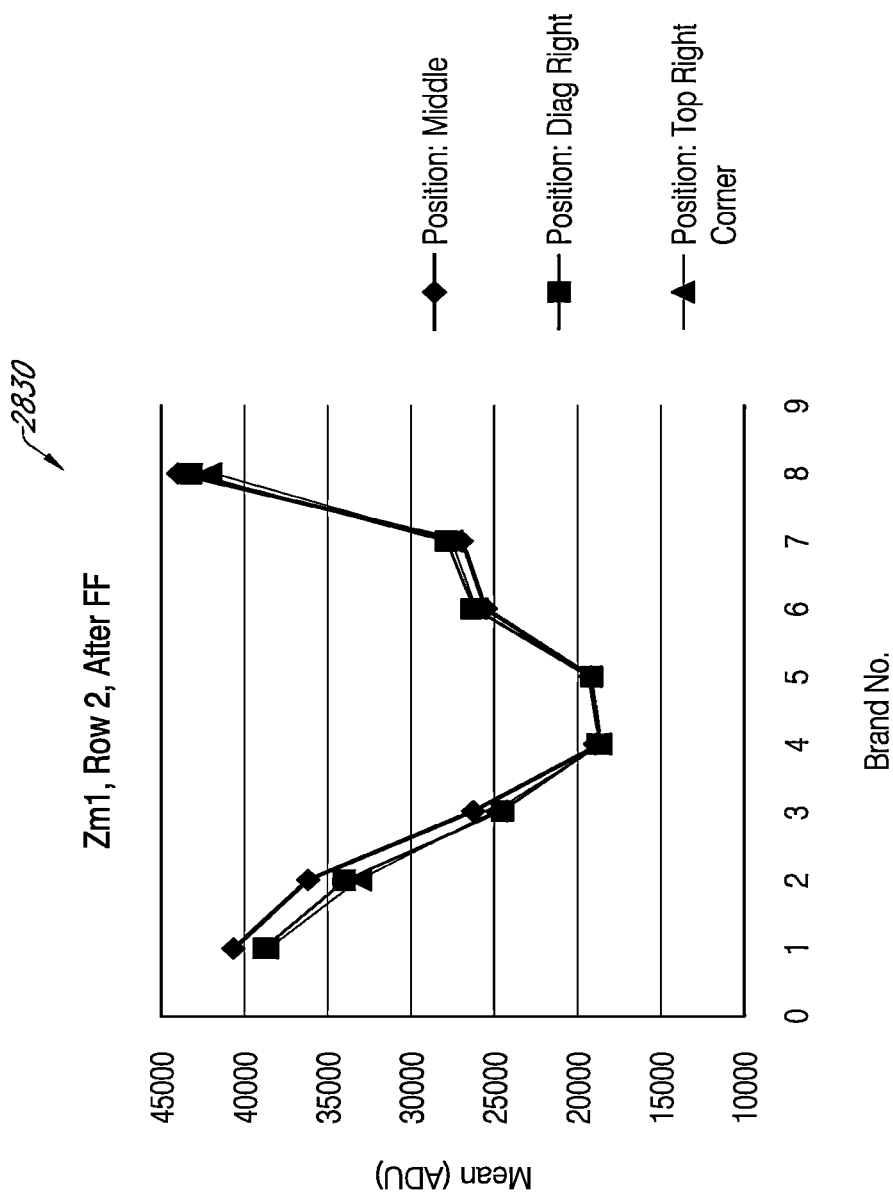
FIG. 28D illustrates a graph showing the second row of FIG. 27 taken at 1× zoom after flat fielding at, according to an embodiment.

FIG. 28A illustrates a graph 2800 showing the first row before flat fielding, FIG. 28B illustrates a graph 2810 showing the first row after applying flat fielding master matrix, FIG. 28C illustrates a graph 2820 showing the second row before applying flat fielding master matrix, and FIG. 28D illustrates a graph 2830 showing the second row after applying flat fielding matrix, according to an embodiment. The zoom is 1× in FIGS. 28A-28D. Before applying flat fielding master matrix, the difference in the ADU (analog-to-digital unit) value is due to the position of the membrane on imager surface/imager screen. After applying flat fielding master matrix, the ADU values are similar regardless of the position of the membrane.

Figure 29A:
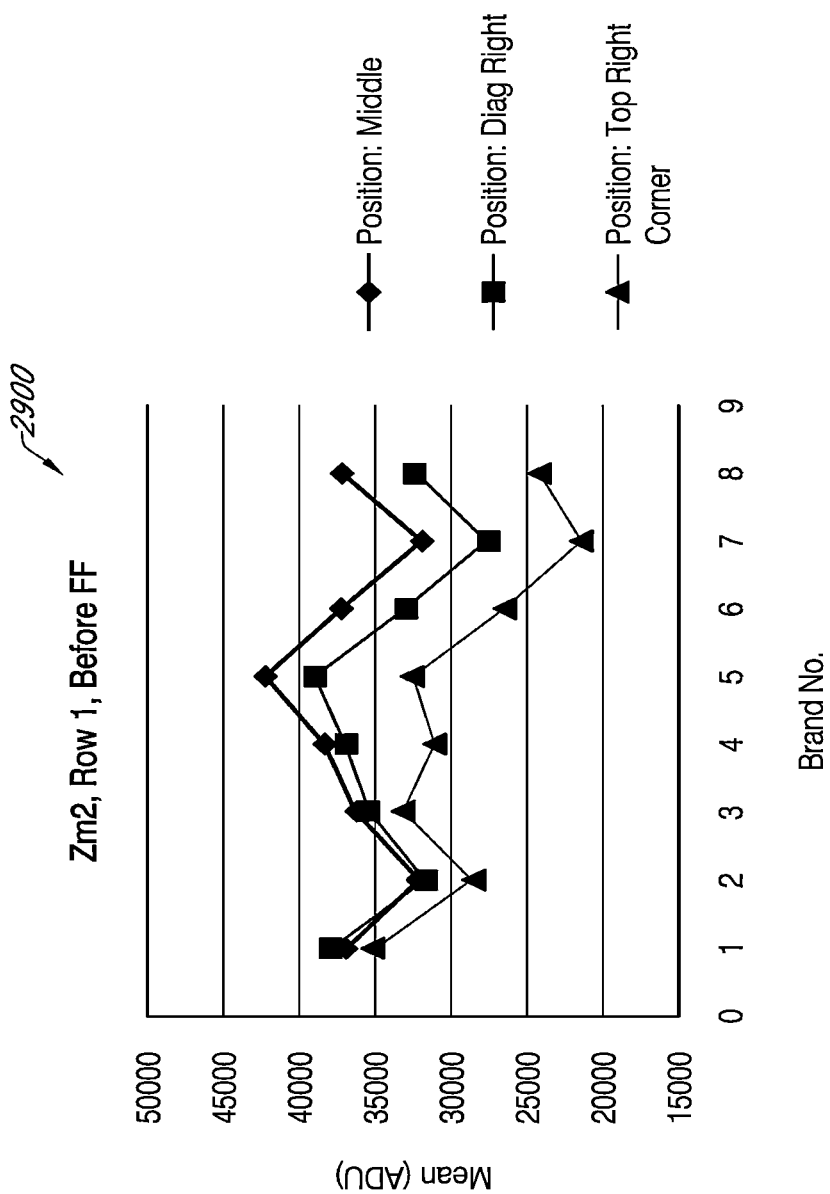
FIG. 29A illustrates a graph showing the first row of FIG. 27 taken at 2× zoom before flat fielding.
Figure 29B:
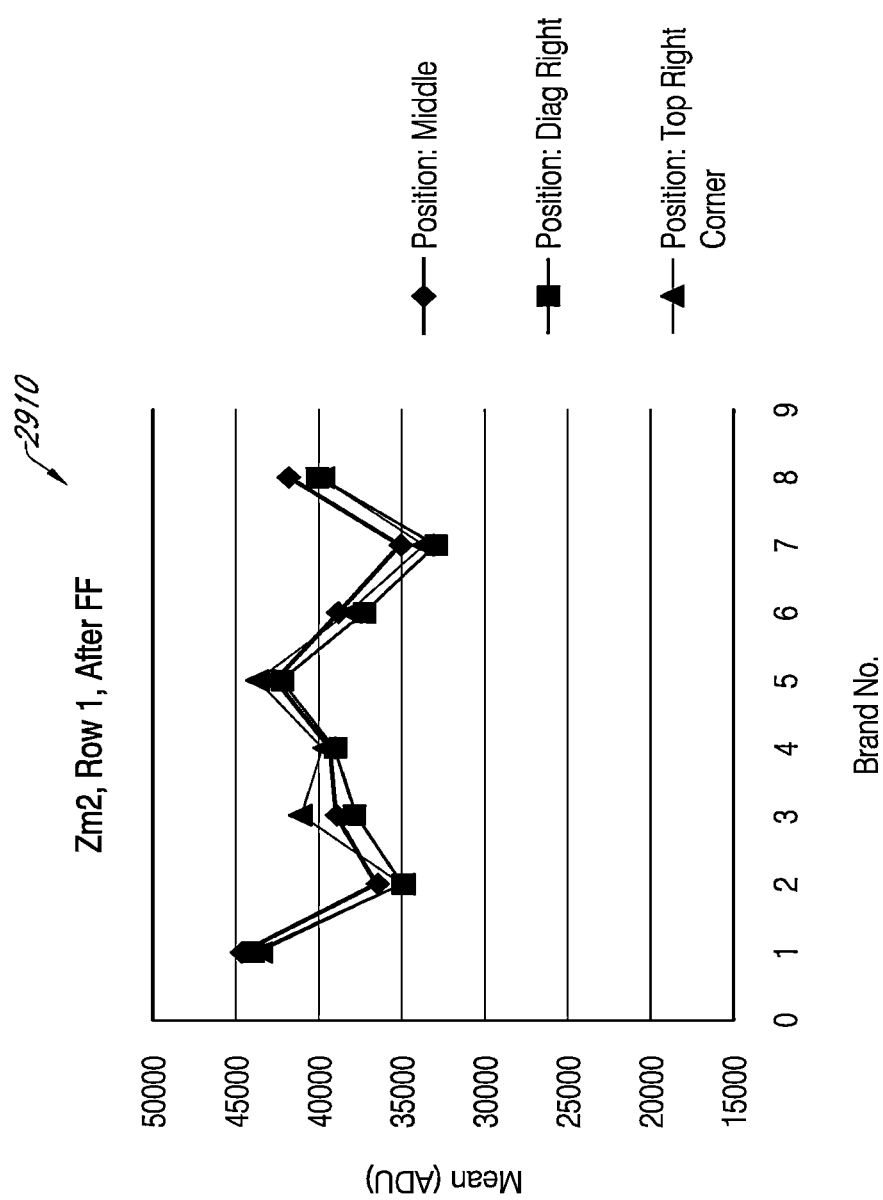
FIG. 29B illustrates a graph showing the first row of FIG. 27 taken at 2× zoom after flat fielding.
Figure 29C:
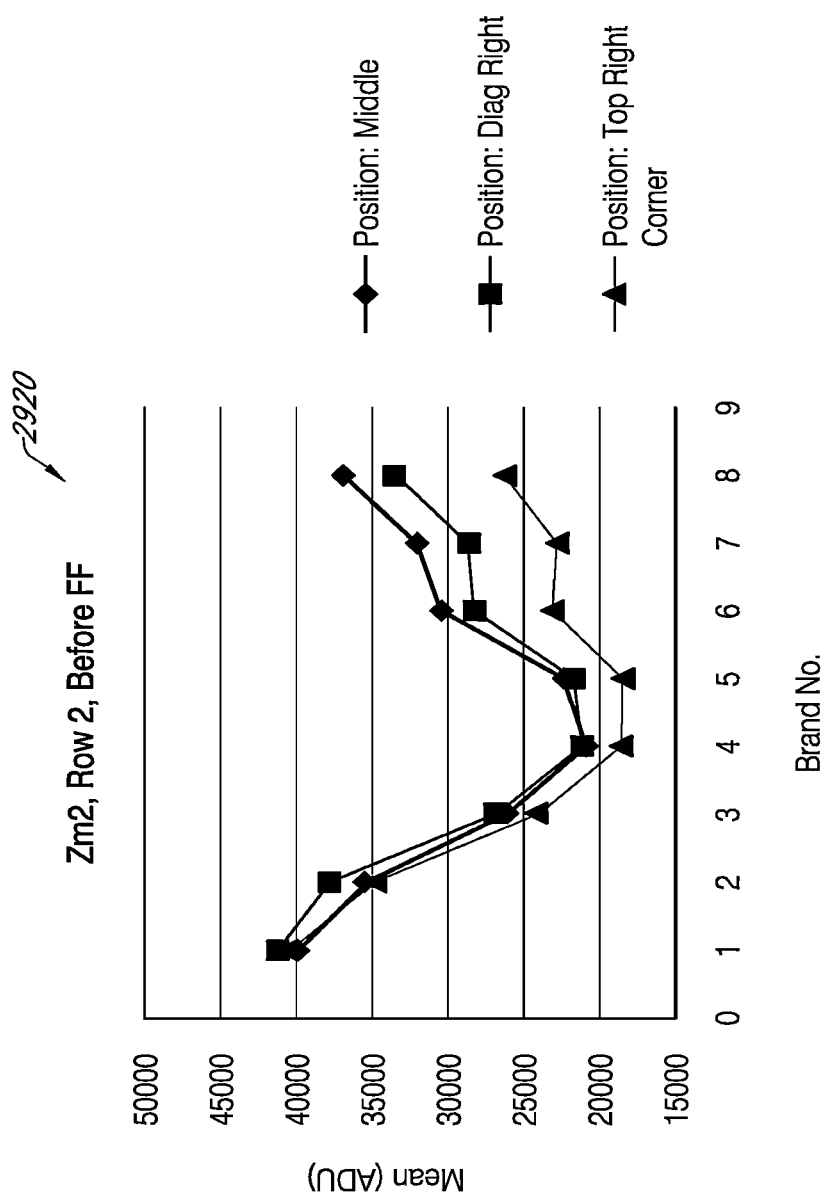
FIG. 29C illustrates a graph showing the second row of FIG. 27 taken at 2× zoom before flat fielding.
Figure 29D:
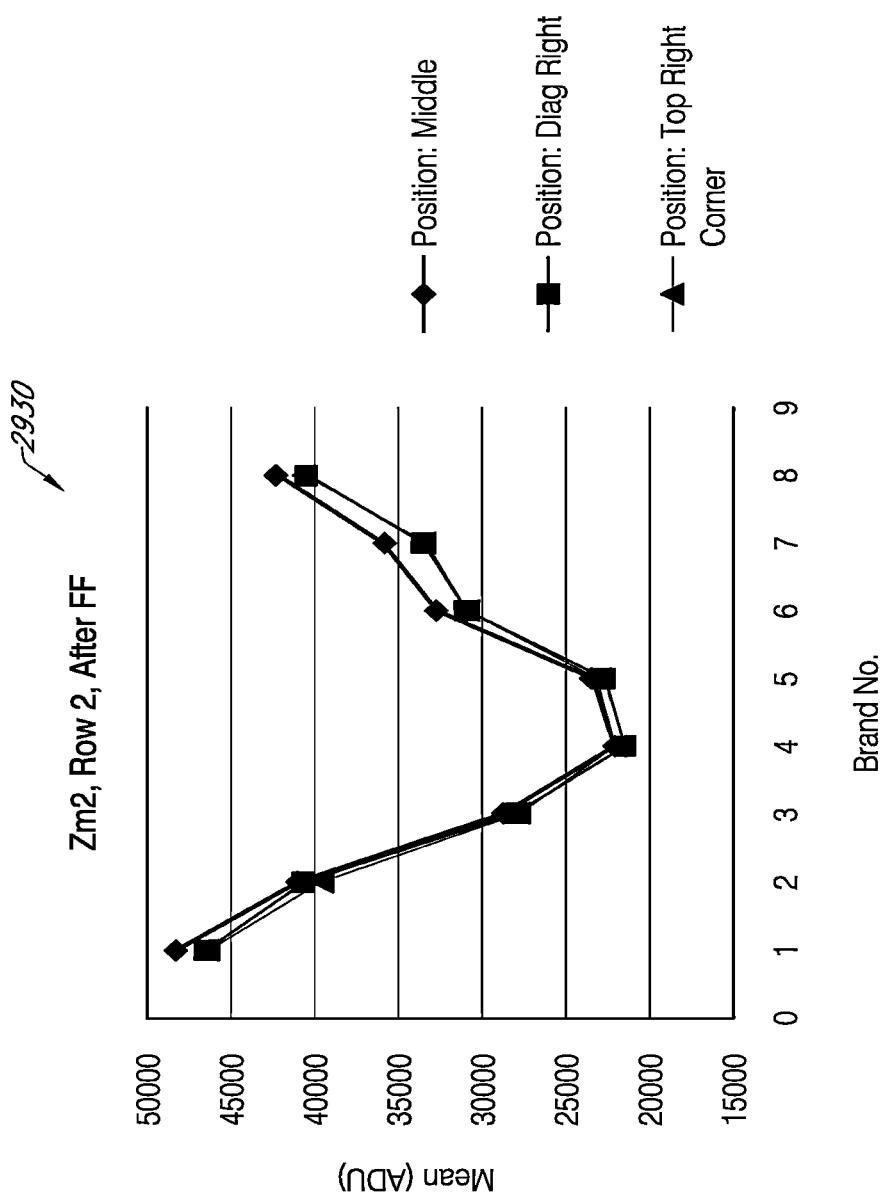
FIG. 29D illustrates a graph showing the second row of FIG. 27 taken at 2× zoom after flat fielding, according to an embodiment.

FIG. 29A illustrates a graph 2900 showing the first row before applying flat fielding master matrix, FIG. 29B illustrates a graph 2910 showing the first row after applying flat fielding master matrix, FIG. 29C illustrates a graph 2920 showing the second row before applying flat fielding master matrix, and FIG. 29D illustrates a graph 2930 showing the second row after applying flat fielding master matrix, according to an embodiment. The zoom is 2× in FIGS. 29A-29D.

Figure 30:
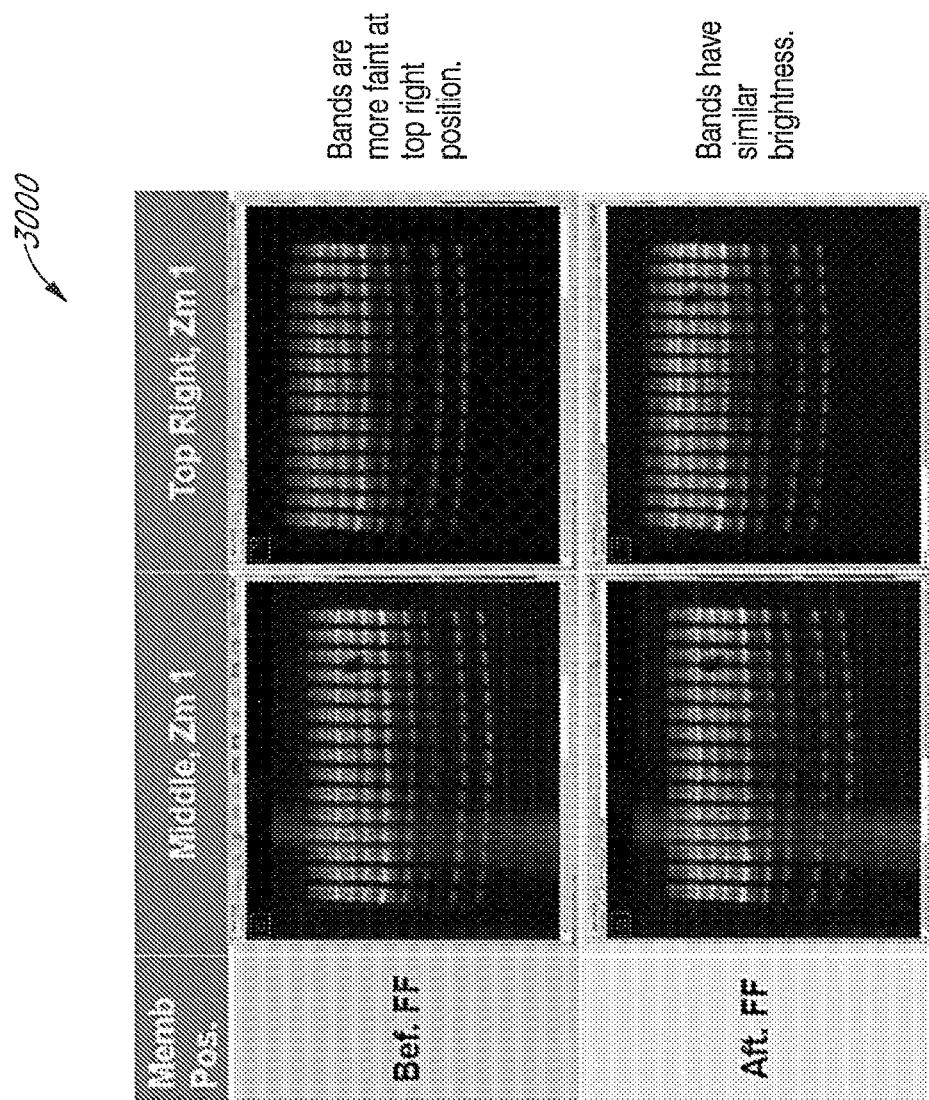
FIG. 30 illustrates a chart showing the membrane position (e.g., middle, top right) before and after flat fielding, according to an embodiment.

FIG. 30 illustrates a chart 3000 showing the membrane position (e.g., middle, top right location/position of the membrane and its sample bands on an imager surface/imager screen) before and after applying flat fielding master matrix, according to an embodiment. As shown, the bands are fainter at the top right position before applying flat fielding master matrix, and the bands have similar brightness after applying flat fielding master matrix.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

What is claimed is:

1. An illumination system, comprising:
   a surface configured to have an imaging target placed thereon;
   a light source configured to emit a beam of light;
   a beam splitter configured to split the beam of light from the light source into a first beam and a second beam, wherein the second beam illuminates the surface;
   a first illumination mirror configured to reflect the first beam from the beam splitter to provide a reflected first beam that illuminates the surface, wherein the first beam, the second beam, the first reflected beam, and the second reflected beam, are positioned on the same side as the surface relative to the first illumination mirror, wherein the beam splitter has a first end and a second end, and wherein the beam splitter splits optical power from the beam of light differently at the first end than at the second end; and
   an imager, the imager comprising:
      an imaging mirror; and
      a capturing device configured to capture an image of the imaging target through a path that extends from the imaging target, reflects off of the imaging mirror, and to the capturing device, wherein the imaging mirror, the capturing device, or both are configured to move in a diagonal direction with respect to the surface to reduce a length of the path.

2. The illumination system of claim 1, further comprising:
   a second illumination mirror configured to reflect the second beam to provide a reflected second beam that illuminates the surface wherein the first beam, the second beam, the first reflected beam, and the second reflected beam, are positioned on the same side as the surface relative to the first illumination mirror and the second illumination mirror.

3. The illumination system of claim 1, wherein the reflected first beam and the reflected second beam provide off-axis illumination of the surface.

4. The illumination system of claim 1, wherein the reflected first beam and the reflected second beam provide substantially symmetrical illumination of the surface.

5. The illumination system of claim 1, wherein the beam of light has a beam of light optical power, the first beam has a first beam optical power and the second beam has a second beam optical power, and wherein the first beam optical power and the second beam optical power are each at least 40% of the beam of the light optical power.

6. The illumination system of claim 5, wherein the first beam optical power and the second beam optical power are each at least 45% of the beam of the light optical power.

7. The illumination system of claim 6, wherein the first beam optical power and the second beam optical power are substantially equal.

8. The illumination system of claim 1, further comprising a third illumination mirror, wherein the reflected first beam or the reflected second beam is configured to reflect off of the third illumination mirror prior to illuminating the surface.

9. The illumination system of claim 1, wherein the beam splitter is configured to split the beam of light from the light source into the first beam, the second beam, and a third beam.

10. The illumination system of claim 1, wherein the beam splitter comprises a prism, a plate, a dielectric mirror, a metal coated mirror, a beam splitter cube, a fiber optic beam splitter, or optical fibers configured to collimate light into a bundle before producing two or more output beams.

11. The illumination system of claim 1, wherein the first beam reflects off of the beam splitter, and wherein the second beam passes through the beam splitter.

12. The illumination system of claim 1, further comprising a second beam splitter configured to split the reflected first beam into two reflected beams that provide different degrees of off-axis illumination of the surface.

13. The illumination system of claim 12, further comprising a third beam splitter configured to split the reflected second beam into two reflected beams that provide different degrees of off-axis illumination of the surface.

14. The illumination system of claim 1, wherein an angle between a center of the first beam and a center of the second beam is from about 62° to about 68°.

15. The illumination system of claim 1, wherein an angle between a center of the reflected first beam and a center of the reflected second beam is from about 106° to about 114°.

16. The illumination system of claim 1, wherein a first distance from the beam splitter to the first illumination mirror to the surface is substantially equal to a second distance from the beam splitter to the second illumination mirror to the surface.

17. The illumination system of claim 1, wherein a center of the path of emitted light reflects off of a point on the imaging mirror, and wherein the point moves when the capturing device and the imaging mirror move respect to the imaging surface to reduce a length of the path of emitted light.

* * * * *